(12) United States Patent
Dolan et al.

(10) Patent No.: US 12,231,995 B2
(45) Date of Patent: *Feb. 18, 2025

(54) TRANSMISSION OF CONTROL DATA ON WIRELESS NETWORK COMMUNICATION LINKS

(71) Applicant: Lutron Technology Company LLC, Coopersburg, PA (US)

(72) Inventors: David J. Dolan, Coopersburg, PA (US); Parker Evans, Quakertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,221

(22) Filed: Dec. 19, 2023

(65) Prior Publication Data

US 2024/0121581 A1  Apr. 11, 2024

Related U.S. Application Data

(63) Continuation of application No. 17/482,285, filed on Sep. 22, 2021, now Pat. No. 11,895,564.

(60) Provisional application No. 63/081,649, filed on Sep. 22, 2020.

(51) Int. Cl.
| | |
|---|---|
| H04W 4/38 | (2018.01) |
| H04W 72/20 | (2023.01) |
| H04W 72/54 | (2023.01) |
| H04W 76/28 | (2018.01) |

(52) U.S. Cl.
CPC ............. *H04W 4/38* (2018.02); *H04W 72/20* (2023.01); *H04W 72/54* (2023.01); *H04W 76/28* (2018.02)

(58) Field of Classification Search
CPC ....... H04W 4/38; H04W 72/20; H04W 72/54; H04W 76/28; H05B 47/19; H05B 47/105; H04B 7/155; H04Q 2209/823; H04Q 2209/70; H04Q 9/00; H04L 12/2803
See application file for complete search history.

(56) References Cited

U.S. PATENT DOCUMENTS

| | | |
|---|---|---|
| 6,927,547 B2 | 8/2005 | Walko et al. |
| 7,085,627 B2 | 8/2006 | Bamberger et al. |
| 7,111,952 B2 | 9/2006 | Veskovic |
| 7,369,060 B2 | 5/2008 | Veskovic et al. |
| 7,391,297 B2 | 6/2008 | Cash et al. |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,410,706 B2 | 4/2013 | Steiner et al. |

(Continued)

FOREIGN PATENT DOCUMENTS

| | | |
|---|---|---|
| GB | 2503467 A | 1/2014 |
| WO | 2016065320 A1 | 4/2016 |

*Primary Examiner* — Abdullahi Ahmed
(74) *Attorney, Agent, or Firm* — Flaster Greenberg, P.C.

(57) ABSTRACT

A device may be configured to process messages from a plurality of input devices. The messages may be received on a first communication link and may be processed for being transmitted on a second communication link. The device may receive messages comprising data on the first communication link from the plurality of input devices. The data from the input devices may be aggregated and transmitted in at least one message on the second communication link.

20 Claims, 11 Drawing Sheets

(56) References Cited

U.S. PATENT DOCUMENTS

| | | | |
|---|---|---|---|
| 8,451,116 B2 | 5/2013 | Steiner et al. | |
| 8,760,293 B2 | 6/2014 | Steiner et al. | |
| 9,590,453 B2 | 3/2017 | Bull et al. | |
| 9,752,383 B2 | 9/2017 | Lundy et al. | |
| 10,196,855 B2 | 2/2019 | Blair et al. | |
| 10,742,032 B2 * | 8/2020 | Neyhart | G05B 15/02 |
| 10,874,005 B2 | 12/2020 | Agarwal et al. | |
| 11,895,564 B2 * | 2/2024 | Evans | H04W 72/54 |
| 2008/0092075 A1 | 4/2008 | Jacob et al. | |
| 2009/0206983 A1 | 8/2009 | Knode et al. | |
| 2010/0244709 A1 | 9/2010 | Steiner et al. | |
| 2014/0265568 A1 | 9/2014 | Crafts et al. | |
| 2015/0326669 A1 * | 11/2015 | Ji | H04L 67/125 |
| | | | 702/188 |
| 2017/0123390 A1 | 5/2017 | Barco et al. | |
| 2018/0114432 A1 * | 4/2018 | Okuda | H04L 12/2823 |
| 2018/0238579 A1 | 8/2018 | Bull et al. | |
| 2018/0241587 A1 | 8/2018 | Bull et al. | |
| 2018/0259922 A1 | 9/2018 | Nill et al. | |
| 2018/0270632 A1 * | 9/2018 | Kaneeda | G08C 17/00 |
| 2018/0364665 A1 | 12/2018 | Clymer et al. | |
| 2019/0384232 A1 | 12/2019 | Casey et al. | |
| 2020/0204884 A1 * | 6/2020 | Lin | H04Q 9/00 |
| 2021/0029807 A1 * | 1/2021 | Bard | H05B 47/115 |
| 2023/0118340 A1 * | 4/2023 | Husain | B60W 50/14 |
| | | | 701/27 |

\* cited by examiner

TRANSMISSION OF CONTROL DATA ON WIRELESS NETWORK COMMUNICATION LINKS

CROSS-REFERENCE TO RELATED APPLICATIONS

This application is a continuation of U.S. Non-Provisional patent application Ser. No. 17/482,285, filed Sep. 22, 2021, which claims priority to U.S. Provisional Patent App. No. 63/081,649, filed Sep. 22, 2020, entitled TRANSMISSION OF CONTROL DATA ON WIRELESS NETWORK COMMUNICATION LINKS, the disclosure of which is hereby incorporated by reference herein in its entirety.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilating, and air conditioning (HVAC) system may be used to control the temperature in the user environment. Each load control system may include various control devices, including control-source devices and control-target devices. The control-target devices may receive messages, which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like.

SUMMARY

A device, such as a wired or wireless system controller, may be configured to be in communication with a plurality of input devices and process the messages received from the plurality of input devices for being transmitted on a wireless communication link. For example, the plurality of input devices may be sensors configured to transmit measurements in sensor data at on a first communication link (e.g., wired or wireless communication link). The sensor data may be received by the wireless system controller and may be configured for being transmitted on a second communication link (e.g., a wireless communication link). The first communication link and the second communication link may use a different communication protocol. The wireless system controller may receive the sensor data on the first communication link and format the sensor data for being transmitted on the second communication link.

The wireless system controller may transmit the sensor data received from the plurality of sensor devices on the second communication link after expiration of a time interval to avoid more frequent transmissions on the second communication link that may cause interference with other communications. The sensor data from multiple sensors may be aggregated for being transmitted on the second communication link to avoid additional communications and potential interference on the second communication link.

Each of the sensors may be configured to transmit messages that include the respectively measured sensor data on the first communication link according to a transmission criteria being met at the respective sensors. In response to receiving messages comprising sensor data from a respective sensor, the wireless system controller may determine a transmission count for the respective sensor. For example, the transmission count for the respective sensor from which the message was received may be based on the transmission criteria that triggered the sensor to transmit the message. Each of the plurality of sensors in communication with the wireless system controller may be associated with a respective transmission count for performing transmissions on the second communication link. For example, the transmission count may indicate the respective number of transmissions for transmitting messages on the second communication link that include the sensor data measured at each of the plurality of sensors. After receiving the messages and determining the respective transmission count for the sensors, the wireless system controller may store the received sensor data measured at the respective sensor device for transmission on the second communication link.

As described herein, the wireless system controller may process the messages received from the plurality of sensors based on the state of the wireless system controller. For example, the state of the wireless system controller may be one of a heartbeat state, a backoff state, or a rapid state. Accordingly, the wireless system controller may identify its current state, and then process the messages received from the plurality of sensors based on the current state of the wireless system controller. For example, when in the heartbeat state, the wireless system controller may determine that at least one of the plurality of sensors is tagged for a transmission (e.g., based on the respective transmission counts of each of the plurality of input devices), and transmit a message comprising sensor data for each of the at least one sensors tagged for transmission. In addition, the wireless system controller may, after expiration of an interval period of time, determine that one or more sensors are tagged for a heartbeat transmission, and then transmit a message comprising sensor data for each of the plurality of sensors. When the wireless system controller is in the backoff state, the wireless system controller may determine whether a message including sensor data has been received during the interval period of time. If a message including sensor data has not been received during the interval period of time, the wireless system controller may transition to the heartbeat state. When the wireless system controller is in the rapid state, the wireless system controller may, upon expiration of the interval period of time, determine that at least one input devices is tagged for a transmission (e.g., based on the respective transmission count of each of the plurality of input devices), and transmit a message comprising sensor data on the second communication link for each of the at least one input device tagged for transmission.

DETAILED DESCRIPTION

Figure 1:
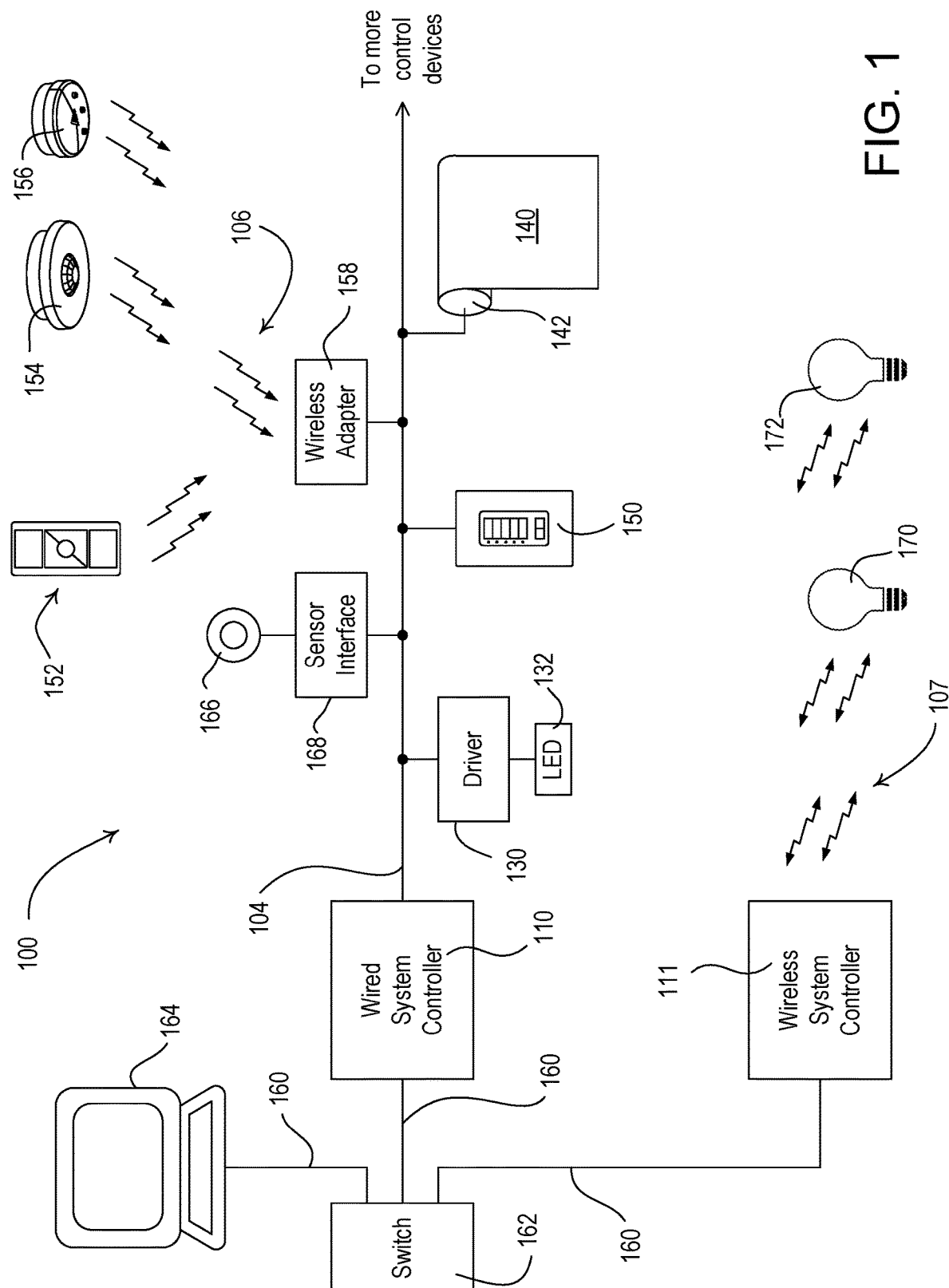
FIG. 1 is a simple diagram of an example load control system for controlling one or more electrical loads.

The foregoing summary, as well as the following detailed description, is better understood when read in conjunction with the appended drawings. Examples are shown in the drawings, in which like numerals represent similar parts throughout the several views of the drawings. The drawings and the description herein are, however, not intended to be limiting.

FIG. 1 is a simple diagram of an example load control system for controlling the amount of power delivered from an alternating-current (AC) power source (not shown) to one or more electrical loads. The load control system 100 may comprise a number of control devices. The control devices may comprise a number of control-source devices and a number of control-target devices. The control-source devices may include, for example, input devices operable to transmit messages in response to user inputs, occupancy/vacancy conditions, changes in measured light intensity, and/or other input information. The control-target devices may include, for example, load control devices operable to receive messages and/or control respective electrical loads in response to the received messages. A single control device of the load control system 100 may operate as both a control-source and a control-target device.

The load control system 100 may comprise a wired system controller 110 (e.g., a system controller or load controller) operable to transmit messages to and/or receive messages from control devices on a wired communication link, such as the wired serial communication link 104, and a wireless communication link, such as a wireless input-device communication link 106. The wireless input-device communication link 106 may be a wireless communication link on which RF signals are communicated from input devices in the load control system 100. The wireless input-device communication link 106 may be a one-way wireless communication link.

As illustrated in FIG. 1, the wired system controller 110 may be coupled to one or more control-source devices and control-target devices (e.g., which may include either wired control devices or wireless control devices) via the wired serial communication link 104 and/or the wireless input-device communication link 106. For example, certain wired control devices of the load control system 100 may use the wired serial communication link 104 to transmit messages to the wired system controller 110. Similarly, and as further described herein, certain wireless control devices of the load control system 100 may transmit messages to the system controller 110 directly via the wireless input-device communication link 106, or on the wired serial communication link 104 via a wireless adapter 158. The wireless adapter device 158 coupled to both the wired serial communication link 104 and the wireless input-device communication link 106, and therefore able to receive the RF signals via the wireless input-device communication link 106 and transmit the messages to the wired system controller 110 received via the RF signals on the wired serial communication link 104. For example, the wireless adapter device 158 may re-transmit the messages received from the wireless control devices on the wired serial communication link 104. Though shown as separate devices, the wireless system controller 111 and the wired system controller 110 may be a part of or comprise functionality of the same device.

The wired system controller 110 may be configured to receive messages from the control-source devices and transmit messages to the control-target devices in response to the messages received, for example, from the control-source devices. The load control system 100 may comprise one or more load control devices that may be controlled in response to messages received from input devices. For example, the load control system 100 may comprise light-emitting diode (LED) drivers 130, for controlling or driving respective electrical load, such as LED light sources 132 (e.g., LED light engines) and/or lighting device 170, 172. The LED drivers 130 may be located remotely, for example, in the lighting fixtures of the respective LED light sources 132. The LED drivers 130 may be configured to receive messages from the wired system controller 110 via the wired serial communication link 104. The LED drivers 130 may be configured to control the respective LED light sources 132 in response to the received messages. The LED drivers 130 may comprise internal RF communication circuits or be coupled to external RF communication circuits (e.g., mounted external to the lighting fixtures, such as to a ceiling) for transmitting and/or receiving messages using the wireless input-device communication link 106. The load control system 100 may further comprise other types of lighting control devices, such as, for example, electronic dimming ballasts for driving fluorescent lamps.

The load control devices in the load control system 100 may comprise a plurality of daylight control devices, e.g., motorized window treatments, such as motorized roller shades 140. The load control system 100 may utilize the plurality of daylight control devices, for example, to control the amount of daylight entering the building in which the load control system 100 is installed. Each motorized roller shade 140 may comprise an electronic drive unit (EDU) 142. The electronic drive unit (EDU) 142 may be located inside a roller tube of the motorized roller shade. The electronic drive units 142 may be operable to communicate with the system controller 110 and/or other devices via wired and/or wireless communication links. The electronic drive units 142 may be coupled to the wired serial communication link 104, for example, to transmit and receive messages. The electronic drive units 142 may be configured to adjust the position of a window treatment fabric in response to messages received from the wired system controller 110 via the wired serial communication link 104. Each electronic drive units 142 may comprise an internal RF communication circuit or be coupled to an external RF communication circuit (e.g., located outside of the roller tube), for example, to transmit and/or receive messages on the wireless input-device communication link 106. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, or other suitable daylight control device.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; hydraulic valves for use in radiators and radiant heating systems; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices, e.g., such as a wired keypad device 150, a wired daylight sensor 166, a battery-powered remote control device 152, a wireless occupancy sensor 154, and/or a wireless daylight sensor 156. The wired keypad device 150 may be configured to transmit messages to the system controller 110 via the wired serial communication link 104 in response to an actuation of one or more buttons of the wired keypad device. For example, the wired keypad device 150 may be configured to transmit messages to the system controller 110 via the wired serial communication link 104 in response to an actuation of one or more buttons of the wired keypad device 150. The messages may include an indication of the button pressed on the wired keypad device 150. The wired keypad device 150 may be adapted to be wall-mounted in a standard electrical wallbox.

The wired daylight sensor 166 may be configured to measure (e.g., periodically measure) a signal (e.g., a photosensor or photodiode current). For example, the signal may be used to determine a value indicative of a light intensity in the space in which the wired daylight sensor 166 is installed (e.g., sensor data). The wired daylight sensor 166 may similarly be configured to transmit messages to wired system controller 110 via the wired serial communication link 104. For example, the wired daylight sensor 166 may be configured to be coupled with a sensor interface 168. The wired daylight sensor 166 may transmit messages (e.g., which may include a respectively measured signal) to the sensor interface 168 periodically in response to periodic measurements. The sensor interface 168 may be configured to transmit a message to the system controller 110 via the wired serial communication link 104 in response to a message received from the wired daylight sensor 166. For example, the sensor interface 168 may re-transmit the messages received from the wireless control devices on the wired serial communication link 104 periodically. In addition, the sensor interface 168 may be configured to convert the signal measured by the wired daylight sensor 166 into an appropriate value that indicates the light intensity in the space (e.g., a daylight value, such as foot-candles or another daylight value). The sensor interface 168 may further transmit the value to the system controller 110 via the wired serial communication link 104. For example, the value may be used for controlling the intensities of one or more of the electrical loads (e.g., LED light sources 132).

The battery-powered remote control device 152, the wireless occupancy sensor 154, and/or the wireless daylight sensor 156 may be wireless control devices. For example, the battery-powered remote control device 152, the wireless occupancy sensor 154, and/or the wireless daylight sensor 156 may include RF transmitters (e.g., one-way RF transmitters) configured to transmit messages directly to the wired system controller 110 using the wireless input-device communication link 106, or indirectly on the wired serial communication link 104 by transmitting messages to the wireless adapter 158 via the wireless input-device communication link 106. The wired system controller 110 may be configured to transmit one or more messages to the load control devices (e.g., the LED drivers 130 and/or the motorized roller shades 140) in response to the messages received from input devices (e.g., the wired keypad device 150, the battery-powered remote control device 152, the wireless occupancy sensor 154, the wired daylight sensor 166, and/or the wireless daylight sensor 156).

The battery-powered remote control device 152 may be configured to transmit messages to the wired system controller 110 in response to an actuation of one or more buttons of the battery-powered remote control device for controlling an electrical load in the load control system 100. The battery-powered remote control device 152 may be configured to transmit messages to the wired system controller 110 directly using the wireless input-device communication link 106, or indirectly on the wired serial communication link 104 by transmitting messages to the wireless adapter 158 via the wireless input-device communication link 106. The messages may include an indication of the button pressed on the remote control device 152.

The wireless occupancy sensor 154 may be configured to transmit messages to the system controller 110. The wireless occupancy sensor 154 may be configured to transmit messages to the wired system controller 110 in response to sensing an occupancy and/or vacancy condition for controlling an electrical load in the load control system 100. The wireless occupancy sensor 154 may be configured to transmit messages to the wired system controller 110 directly using the wireless input-device communication link 106, or indirectly on the wired serial communication link 104 by transmitting messages to the wireless adapter 158 via the wireless input-device communication link 106. The wireless occupancy sensor 154 may transmit messages that include occupancy conditions or a vacancy conditions identified by the occupancy sensor 154. Examples of RF load control systems having wireless occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY- POWERED OCCUPANCY SENSOR, the entire disclosures of which are hereby incorporated by reference.

The wireless daylight sensor 156 may be configured to measure (e.g., periodically measure) a signal (e.g., a photosensor or photodiode current), which, as described herein, may be used to determine sensor data (e.g., a value indicative of the light intensity in the space in which the wireless daylight sensor 156 is installed). The wireless daylight sensor 156 may be configured to transmit messages including the periodically measured signals to the wired system controller 110 for controlling one or more electrical loads in the load control system 100 in response to the light intensity in the space. The wireless daylight sensor 156 may be configured to transmit messages to the wired system controller 110 directly using the wireless input-device communication link 106, or indirectly on the wired serial communication link 104 by transmitting messages to the wireless adapter 158 via the wireless input-device communication link 106.

The input devices in the load control system may decide whether to transmit a message including a measured signal according to a certain transmission criteria, for example, to conserve battery power and/or resources on the wireless input-device communication link 106. In one example, the sensor devices may take a measurement and decide whether to transmit a message on the wireless input-device communication link 106 based on certain transmission criteria. For example, the wireless daylight sensor 156 may perform periodic measurements and determine whether to transmit the measurement in a message based on transmission criteria stored at the wireless daylight sensor 156. According to the transmission criteria, the wireless daylight sensor 156 may determine to transmit a message including the measured signal when the measurement has changed by at least a threshold amount. The wireless daylight sensor 156 may also determine not to transmit a message including the measured signal when the rate of change in the measured signal is too high (e.g., greater than a threshold), which may indicate that intermittent clouds are passing over the sun. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

As described herein, the wireless daylight sensor 156 (e.g., or other wireless input devices) may be configured to transmit messages that include sensor data (e.g., for controlling the intensities of one or more electrical loads) according to a certain transmission criteria. For example, at certain times of day (e.g., around noon and/or at night), the change in sensor data measurements over that period of time may be minimal or negligible and may not reach a threshold level to trigger a change in control of an electrical load. Transmitting messages after each measurement may, at certain times of the day, overload the wireless input-device communication link 106 (e.g., cause increased processing of messages at devices in the load control system 100 and/or interference due to increased message transmission resulting in the RF signals on the wireless input-device communication link 106 failing to be received) and/or drain battery power, with little to no change resulting in the electrical loads. At other times of the day, however, the changes in the sensor data measurements may be appreciable and may reach or exceed a threshold level to trigger a change in control of an electrical load.

To balance the transmission of messages, wireless daylight sensor 156 may transmit messages in response to pre-defined transmission criteria. For example, the wireless daylight sensor 156 may be configured to take measurements and determine whether to transmit each measurement in response to the transmission criteria. In another example, the wireless daylight sensor 156 may accumulate samples of measured daylight levels over a predefined period of 15 seconds (e.g., accumulating 10 samples each 1.5 seconds). The wireless daylight sensor 156 may then analyze the samples of sensor data accumulated over that period of time and determine whether transmission criteria are met to trigger transmission of the sensor data in one or more messages.

Different transmission criteria may define different thresholds for transmitting the messages in response to the sensor data measured at sensor devices, such as the daylight sensor 156. For example, a standard criteria may be defined for transmitting messages from sensor devices during normal operation when the standard criteria is met. When greater changes in measurements are detected, the sensor devices, such as the daylight sensor 156, may perform a more rapid response to the changes in the measurements to perform control in the load control environment.

In one example, the wireless daylight sensor 156 may be configured with a standard criteria for enabling transmission of messages during normal operation when the standard criteria is met. The standard criteria may be used to define a stable period of time in which sensor data (e.g., photo sensor current measurements or calculated daylight values, such as foot-candles or another daylight value, temperature values, color temperature values, etc.) is relatively stable and may transmit sensor data when a threshold amount of change from the stable period is identified in the sensor data. The standard criteria may prevent the transmission of messages when the sensor data is relatively stable, and allow for transmission when a threshold amount of change in the sensor data is detected. The standard criteria may be met when a stability criteria identifying the stable periods of sensor data and a change criteria identifying the threshold amount of change are both met. The stability criteria may be met when the lowest sensor data measured over the pre-defined period of time and the highest sensor data measured over the predefined period of time are within a predefined range of each other. For example, the stability criteria may be met when the lowest measured and the highest measured sensor data over the predefined period of time are within 10% of each other, or are within a predefined value of each other. Referring again to the wireless daylight sensor 156, the stability criteria may be met when the lowest measured and the highest measured daylight levels over the predefined period of time are within 10% of each other, or are within two foot-candles of each other.

The change criteria may be met when a current measurement in the sensor data has changed by greater than or equal to one or more predefined thresholds from the previously reported sensor data. For example, the wireless daylight sensor 156 may determine that the change criteria is met when a current measurement in the daylight levels has changed by greater than or equal to 15% and/or is greater than or equal to two foot-candles from the previously reported sensor data. If the standard criteria is met (e.g., the change criteria is met or both the stability criteria and the change criteria are met), the wireless daylight sensor 156 may transmit the currently measured sensor data, as the threshold amount of change has been detected from the stable period.

The wireless daylight sensor 156 may also be configured with a rapid response criteria for enabling transmission of messages, for example, when a relatively rapid change in the measured sensor data is detected (e.g., rapid change in daylight levels). The rapid response criteria may include one or more thresholds that indicate a threshold amount of change greater than the change criteria for the standard criteria. If there is a rapid change detected in the sensor data (e.g., photo sensor current measurements or calculated daylight values, such as foot-candles or another daylight value, temperature values, color temperature values, etc.) between consecutive measurements, the wireless daylight sensor 156 may trigger transmission of a message to indicate the rapid change in sensor data. For example, the wireless daylight sensor 156 may determine whether a predefined number of consecutive measurements of daylight levels (e.g., 2 consecutive measurements) meet the rapid response criteria. The rapid response criteria may be met when the most recently measured sensor data is below a predefined threshold (e.g., 5 foot-candles) and/or the difference between a previously transmitted sensor data and the most recently measured sensor data is greater than one or more predefined thresholds (e.g., greater than 10 foot-candle and/or greater than 20%). If the rapid response criteria is met, the wireless daylight sensor 156 may transmit the most recently measured sensor data to provide the measurement that triggered the transmission.

If the rapid response criteria is met, the wireless daylight sensor 156 may also transmit a predefined number of subsequently accelerated update messages for the measured sensor data for a predefined period of time. For example, the wireless daylight sensor 156 may transmit sensor data subsequently measured at zero seconds (e.g., time of transmission event), 6 seconds, 12 seconds, 24 seconds, 36 seconds, 48 seconds, and/or 60 seconds. The transmission times for the update messages may be selected to reduce oscillations in the electrical loads based on the sensor data, while also providing more frequent updates of the sensor data.

The wireless daylight sensor 156 may also be configured to periodically transmit sensor data in a heartbeat message (e.g., in addition to or irrespective of other transmissions). For example, the wireless daylight sensor 156 may transmit a heartbeat message that includes sensor data when a heartbeat criteria are met. The heartbeat criteria may define a period of time (e.g., 60 to 68 minutes) at which a currently measured sensor data is regularly transmitted. In an example, the wireless daylight sensor 156 may transmit a heartbeat message that includes the current daylight level after the defined period of time to let other devices know the measured sensor data after a prolonged period of time and/or that the sensor is still properly communicating or operating. Examples of transmitting messages that include sensor data according to a transmission criteria are described in greater detail in commonly-assigned U.S. Patent Application Publication No. 2010/0244709, published Sep. 30, 2010, entitled WIRELESS BATTERY-POWERED DAYLIGHT SENSOR, the entire disclosure of which is hereby incorporated by reference.

Though the wireless daylight sensor 156 is provided as an example, other types of devices or sensors may similarly be implemented to perform measurements and transmit messages in response to transmission criteria. For example, temperature sensors may measure the temperature of a space and transmit temperature measurements in response to transmission criteria (e.g., to balance the transmission of messages as the sensor data changes with changes in temperature) for controlling an HVAC system. Color temperature sensors may measure a color temperature of a lighting load and transmit color temperature measurements in response to transmission criteria (e.g., to balance the transmission of messages as the sensor data changes with changes in color temperature) for controlling the color temperature of lighting loads. These sensors may similarly comprise standard criteria for transmitting messages during normal operation, rapid response criteria for transmitting messages in response to relatively greater change in sensor measurements, and/or heartbeat criteria for sending heartbeat messages after a period of time.

The load control system 100 may comprise other types of input devices, such as, for example, temperature sensors, color temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of input devices.

The operation of the load control system 100 may be programmed and/or configured for being stored at one or more system controllers and/or control devices using the personal computer 164 or other network device. The personal computer 164 may execute a graphical user interface (GUI) configuration software for allowing a user to program how the load control system 100 may operate. The configuration software may generate a load control database that defines the operation of the load control system 100. For example, the load control database may include information regarding the operational settings of different load control devices of the load control system 100 (e.g., the LED drivers 130 and/or the motorized roller shades 140). The load control database may include information regarding associations between the load control devices and the input devices (e.g., the wired keypad device 150, the battery-powered remote control device 152, the wireless occupancy sensor 154, the wired daylight sensor 166, and/or the wireless daylight sensor 156), and information regarding how the load control devices respond to inputs received from the input devices. The load control database, or portions thereof, may be transmitted to one or more system controllers and/or control devices via wired and/or wireless communication links for being stored thereon. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The wired system controller 110 may receive messages from the input devices for being communicated to load control devices configured to control electrical loads. The wired system controller may be operable to be coupled to a network, such as a wired local area network (LAN), via a wired network communication link 160 (e.g., an Ethernet communication link), for example, for access to the Internet. The wired system controller 110 may be connected to a switch 162 (or Ethernet switch) via the wired network communication link 160 for allowing the wired system controller 110 to communicate with additional system controllers, such as the wireless system controller 111, for controlling additional electrical loads with which the wireless system controller may be in communication, such as lighting devices 170, 172. For example, the wired system controller 110 may receive a message from an input device and determine (e.g., from association information associating the input device with one or more load control devices) that the message is to be forwarded to another system controller, such as the wireless system controller 110 for being communicated to load control devices with which the wireless system controller is capable of performing communication, such as lighting devices 170, 172.

The wireless system controller 111 may be configured to communicate with the wired system controller 110 via the wired network communication link 160. The wireless system controller 111 may also be operable to transmit and receive messages via a wireless network communication link 107. For example, the wireless system controller 111 may be capable of communicating with control devices (e.g., lighting devices 170, 172) via wireless network communication link 107. The wireless network communication link 107 may be used to transmit messages via RF signals. The wireless network communication link 107 may be distinct from the wired serial communication link 104 and/or the wireless input-device communication link 106. For example, the RF wireless network communication link 107 may utilize a different channel and/or a different communication protocol than the wireless input-device communication link 106.

As illustrated in FIG. 1, the wireless system controller 111 may be capable of communicating with one or more control-source devices and/or control-target devices, such as lighting devices 170, 172, via the wireless network communication link 107. Lighting devices 170, 172 may include controllable light sources that are similar to the LED light sources 132. For example, lighting devices 170, 172 may include a lighting control device, such as an LED driver, capable of controlling a color and/or intensity of a controllable light source, such as an LED light source. The lighting devices 170, 172 may be controlled in response to messages that include certain data (e.g., control data and/or sensor data) transmitted by one or more input devices, such as the wired keypad device 150, the battery-powered remote control device 152, the occupancy sensor 154, the wired daylight sensor 156, the wireless daylight sensor 166, temperature sensors, color temperature sensors, etc. These messages that include data for performing control may be received by the wireless system controller 111, and the wireless system controller 111 may then, based on the data, determine whether to transmit the messages (e.g., or the data included in the messages) on the wireless network communication link 107 (e.g., for controlling lighting devices 170, 172).

The wireless system controller 111 may receive a message including data (e.g., control data, sensor data, etc.) for performing control for one or more devices on the wireless network communication link 107 (e.g., lighting devices 170, 172). The wireless system controller 111 may determine (e.g., from the associations in a load control database) that the data is associated with (e.g., may be used for controlling) a load control device coupled to the wireless network communication link 107. For example, this determination may be made using the association information stored in the load control database. In response to receiving such a message, the wireless system controller 111 may determine whether to transmit the received data on the wireless network communication link 107 based on a transmission criteria.

After determining to transmit the data on the wireless communication network that utilizes RF signals 107, the wireless system controller 111 may be configured to format and/or aggregate the received data for transmission in a message over the wireless network communication link 107. As described herein, the frequency at which message are received by the wireless system controller 111 may vary across the various devices that are transmitting the messages. For example, as described herein, the wired daylight sensor 166 may be configured to periodically transmit messages that include sensor data, while the wireless daylight sensor 156 may be configured to transmit message that include sensor data based on a transmission criteria (e.g., when the measured sensor data changes by a predefined threshold over a predefined period of time). As a result of varied frequency of message transmissions, the wireless system controller 111 may periodically receive messages from some devices, and aperiodically receive message from other devices. As result, the wireless system controller may be configured to aggregate the data received over a predefined period of time, and periodically transmit the aggregated data on the wireless network communication link 107.

If the wireless system controller 111 forwards messages (e.g., or the data included in the messages) to devices coupled to the wireless network communication link 107 (e.g., lighting devices 170, 172) at the frequency with which the messages are received, other messages transmitted on the wireless network communication link 107 may experience undue interference. In an example, the communication protocol of the wireless network communication link 107 link may utilize multicast or broadcast messages, which may cause one or more broadcast or multicast messages to be transmitted on the wireless network communication link 107 each time a measurement is performed by a sensor device (e.g., the occupancy sensor 154, the daylight sensors 156, 166, temperature sensors, color temperature sensors, etc.). These broadcast or multicast messages may cause interference on the wireless network communication link 107, as additional messages may be transmitted with a relatively high frequency. Accordingly, as described herein, the wireless system controller 111 may format the received data for transmission in messages for transmission via the wireless network communication link 107 to limit the likelihood of interference with other messages being transmitted over the wireless communication network link 107.

The wireless system controller 111 may be configured to aggregate the received messages or data, and efficiently distribute and/or transmit these messages to the devices coupled to the wireless network communication link 107. For example, the wireless system controller 111 may aggregate the messages or data received from each device over a period of time. With respect to aggregating messages including data from one or more input devices, for example, the wireless system controller 111 may be configured to maintain or store the received messages or data based on the respective device from which the messages or data is received. Taking, for example, messages that include sensor data received from sensor devices (e.g., the daylight sensors 156, 166, occupancy sensor 154, etc.), the wireless system controller 111 may be configured to maintain the sensor data received from each of the one or more sensor devices. The wireless system controller 111 may then independently determine whether the sensor data received from a respective sensor device is to be transmitted to the devices on the wireless network communication link 107. For example, the wireless system controller 111 may process the received sensor data to determine if it meets a transmission criteria for transmission to devices on the wireless network communication link 107 (e.g., similar to the transmission criteria described herein with respect to the wireless daylight sensor 156 for enabling efficient communication on a wireless communication network). Determining whether to transmit sensor data based on the transmission criteria may allow the wireless system controller 111 to account for the varying frequency at which messages that include sensor data are received. This transmission criteria may also allow the wireless system controller 111 to account for whether changes in the sensor data are appreciable (e.g., whether changes in the sensor data reach or exceed a threshold level to trigger a change in control of an electrical load).

The wireless system controller 111 may be configured to transition between one of a plurality of states. For example, the wireless system controller 111 may have computer-executable instructions stored thereon that, when executed by a control circuit, cause the control circuit to execute a local state machine that is capable of transitioning between states for transmitting messages. The state machine may be configured to transition between two or more states.

The state machine may transition between the respective states based on transmission criteria, as described herein. For example, the state machine may transition between the respective states based on an expiration of an interval timer or based on whether the sensor data is received from a respective sensor device to be transmitted to the devices on the wireless network communication link 107. Depending on its respective state of the state machine being executed thereon, the wireless system controller 111 may aggregate the sensor data received from each of the sensor devices over a predefined period of time, and package the aggregated sensor data received over the period of time for transmission in one or more messages to devices (e.g., lighting devices 170, 172) on the wireless network communication link 107. That is, the wireless system controller 111 may transition between the various states in response to the sensor data from a given sensor and/or determining that the transmission criteria is met for a given sensor. As a result, the state of the wireless system controller 111 may, depending on the received sensor data and/or the transmission criteria, also vary over time.

Although certain techniques and procedures are described herein as being performed by the wireless system controller, they may also be performed by other devices in the load control system. For example, the techniques and procedures may also, or alternatively, be performed by a wired system controller (e.g., the wired system 110 shown in FIG. 1). The wireless system controller 111 and the wired system controller 110 may be the same device. Similarly, although certain examples are described within the context of sensor data or specific sensor data, such as daylight sensor data, these techniques may also be used to receive, package, and/or transmit sensor data from other types of sensor or other types of data from control devices on one communication link to another communication link. Moreover, the types of communication links (e.g., wired or wireless communication links comprising different communication protocols) are also similarly non-limiting. That is, the techniques described herein may be used to facilitate communications between a first communication link that is associated with a first protocol, transmission scheme, and/or message format and a second communication link that is associated with a second protocol, transmission scheme, and/or message format.

Figure 2A:
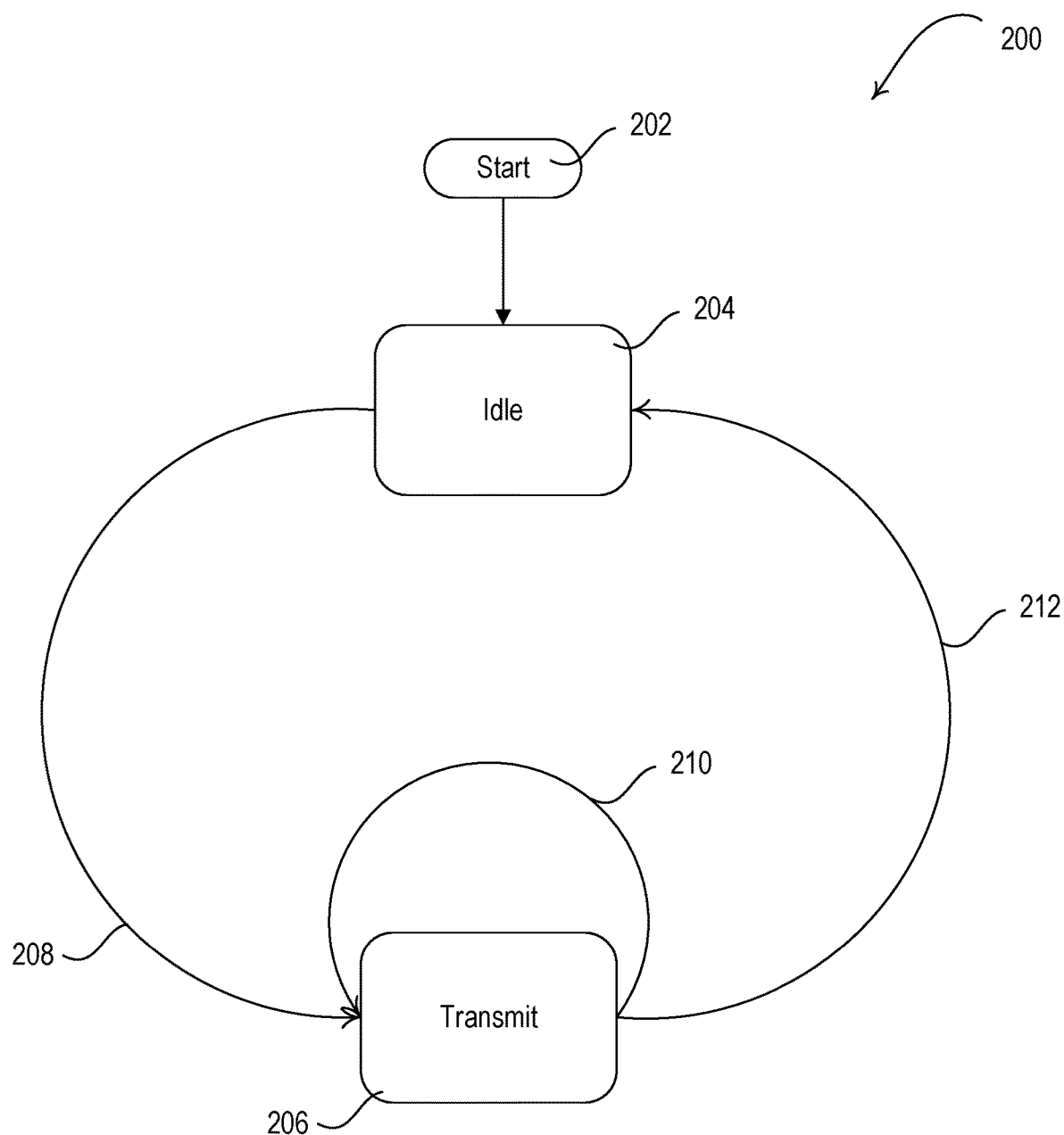
FIGS. 2A and 2B are state machine diagrams associated with example procedures that may be executed by a control circuit for transitioning between different states for transmitting messages on one or more communication links.

FIG. 2A is a state machine diagram illustrating the operation of an example procedure 200 (e.g., a state machine procedure) that may be executed by a control circuit for transitioning between different states in order to transmit messages on one or more communication links, such as the wireless network communication link 107 shown in FIG. 1. For example, the procedure 200 may be executed by a control circuit of a system controller, such as the wireless system controller 111 or the wired system controller 110 shown in FIG. 1. Though the system controller may be provided as an example device on which the procedure 200, or portions thereof, may be implemented, the procedure 200, or portions thereof, may be executed by a control circuit of a sensor device transmitting messages, or another device capable of performing wired and/or wireless communications as described herein.

Figure 2B:
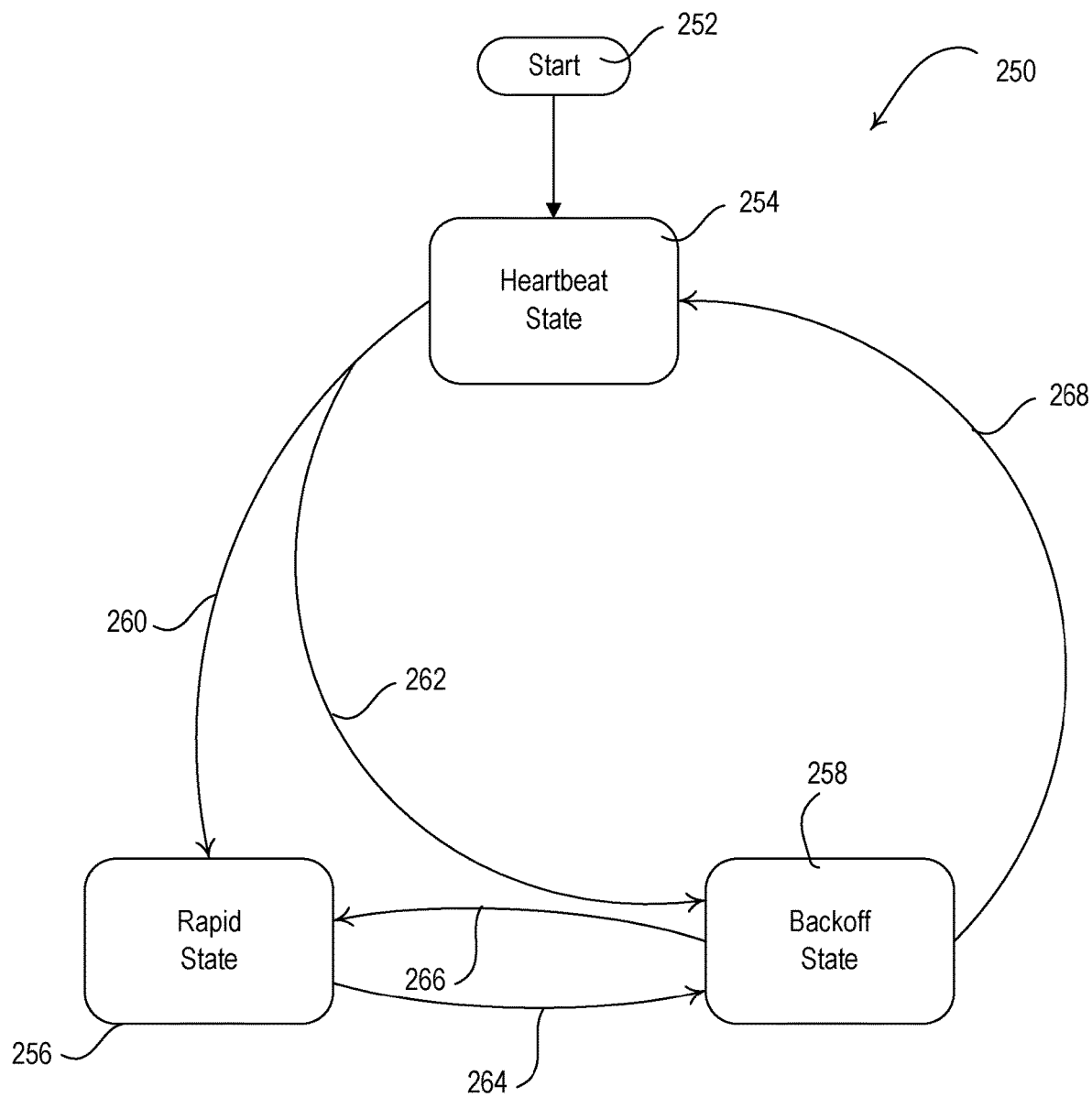

As shown in FIG. 2A, the control circuit may be configured to transition between an idle state 204 and a transmit state 206. The idle state 204 may be a heartbeat state or another state in which the control circuit remains idle for a period of time. Though a single transmit state 206 is shown in FIG. 2A, one or more transmit states may be implemented for transmitting one or more messages in response to transmission criteria, as described herein (e.g., as shown in FIG. 2B). Additionally, although different states are being implemented via a state machine as an example, the control circuit may similarly track or control the transmission of messages via other information or models stored and/or executed by the control circuit. For example, the control circuit may set and store in memory a state of a transmit flag. The transmit flag may be set for enabling transmissions or indicating an idle period as described for the transmit state 206 and idle state 204, respectively.

The procedure 200 may begin execution at 202. For example, the control circuit may execute the procedure 200 at 202 after the system controller is powered on. The control circuit may default to the idel state 204 after being powered on. When the control circuit enters the idle state 204, the control circuit may set an interval timer to an idle interval period. In one example, the idle interval period may be the heartbeat interval period (e.g., approximately 60 minutes as described herein). The idle interval period of time may be randomized within a predefined range (e.g., approximately 60 minutes to 68 minutes) to allow for an offset of heartbeat transmissions for multiple system controllers. The idle interval period may allow for the control circuit to delay transmissions on the communication link, while allowing the control circuit to enter the transmit state to transmit messages (e.g., heartbeat messages) to devices (e.g., lighting devices 170, 172) on the communication link at periodic intervals.

The control circuit may enter or transition to the transmit state 206 to enable transmission of one or more messages with sensor data on the communication link. The control circuit may enter the transmit state 206 when one or more transmission criteria are met. The transmission criteria may be met upon an expiration of the interval timer that is set by the control circuit or upon receipt of sensor data for one or more sensor devices that meets predefined criteria. For example, the control circuit may identify that the idle interval period to which the interval timer has been set during the idle state 204 has expired.

When the control circuit is in the idle state 204 and the idle interval period of time has elapsed, the control circuit may set a transmission count (e.g., transmission count=1) for each of the sensors devices for which the transmission criteria has been met and may enter or transition to the transmit state 206 for performing transmission of a message (e.g., a heartbeat message) that includes the sensor data for each of the sensor devices. The message that is transmitted after the idle interval period of time may include a previous measured sensor data for the sensor, a most recently received measured sensor data for the sensor, or a previously transmitted measured sensor data that was transmitted in a message prior to the idle interval period for each of the sensor devices. The interval timer may be set to a null value or set to zero upon entering the transmit state 206 to cause the control circuit to transmit the message upon entering the transmit state 206, as the control circuit may have already delayed transmissions for a period of time. In another example, the control circuit may set the interval timer to a predefined period of time (e.g., approximately 6 seconds) and transmit the message on the wireless network communication link at the expiration of the interval timer.

After transmitting the message in the transmit state 206, the control circuit may decrement the transmission count for each sensor for which sensor data was transmitted and set the interval timer to a predefined period of time after a message transmission. For example, the control circuit may decrement the transmission count by one for each sensor and set the interval timer to a predefined period of time or transmission delay time (e.g., approximately 6 seconds). The control circuit may await the predefined period of time or transmission delay time after transmission of the message at 210. At the expiration of the interval timer when the control circuit is in the transmit state 206, the control circuit may determine whether any sensor devices have measured sensor data to be transmitted (e.g., transmission count greater than zero). If there is no other sensor device with measured sensor data to be transmitted and no other transmission criteria are met while the control circuit is in the transmit state 206, the control circuit may return to the idle state 204 at 212. The control circuit may set the interval timer to the idle interval period of time (e.g., heartbeat interval period of time) and start the interval timer upon the control circuit entering the idle state 204.

Other transmission criteria may be identified for causing the control circuit to increment a transmission count for a given sensor device and transitioning to or remain in the transmit state 206 for enabling transmission on the communication link. The other transmission criteria may be based on the measured sensor data that is received at the control circuit from one or more sensor devices. As described herein, the transmission criteria may account for the varying frequency at which messages that include sensor data may be received by the control circuit and/or whether changes in the sensor data are appreciable (e.g., whether changes in the sensor data reach or exceed a threshold level of change to trigger a change in control of a device coupled to the wireless network communication link).

The transmission criteria may include standard criteria that may be identified to trigger the control circuit to increment a transmission count for a given sensor and transmit messages in the transmit state 206. The standard criteria may identify a threshold amount of change in the measured sensor data received from the sensor devices. The standard criteria may be used to define a stable period of time in which sensor data in the messages being received from the sensor devices is relatively stable as compared to other periods of time when the sensor data is changing more rapidly. The standard criteria may allow for the control circuit to continue to aggregate sensor data from a sensor device and transmit the sensor data on the wireless communication link when the threshold amount of change in the sensor data is detected during the stable period. In an example, the control circuit may determine that the standard criteria is met for performing transmissions when the received sensor data indicates that both a stability criteria and a change criteria are met for that sensor, as described herein. The stability criteria may be met at the control circuit when the lowest sensor data received by the control circuit from a sensor device and the highest sensor data received by the control circuit from the sensor device over a predefined period of time are within a predefined range of each other to indicate a certain level of stability in the sensor data over the period of time. For example, the stability criteria may be met when the lowest measured and the highest measured sensor data over the predefined period of time are within 10% of each other, or are within a predefined value of each other. Referring as an example to a wireless daylight sensor, the stability criteria may be met when the lowest daylight levels and the highest daylight levels received from the daylight sensor over the predefined period of time are within 10% of each other, or are within two foot-candles of each other.

While the sensor data is within the stable period indicated by the stability criteria, the control circuit may continue to aggregate the sensor data and prevent transmission of the sensor data until the change criteria is met. The control circuit may continue to reset the interval timer to a predefined period of time during which the stability criteria is maintained within the predefined range. While the stability criteria continues to indicate that the sensor data is within a stable period, the control circuit may determine whether the change criteria is met for triggering a transmission. In another example, the control circuit may rely on the change criteria as the threshold amount of change for the standard criteria. The change criteria may identify when a threshold amount of change in the sensor data is exceeded and allow transmission of the sensor data to provide an update as to the identified change. The change criteria may be met at the control circuit when the most recently received sensor data from a sensor device is greater than or equal to one or more predefined thresholds from a previously reported sensor data. For example, the control circuit may determine that the change criteria is met when a current value in the daylight levels received from a daylight sensor has changed by greater than or equal to 15% and/or is greater than or equal to a total predefined amount, such as two foot-candles, from the previously reported sensor data in a previously transmitted message. While the change criteria is indicated as a threshold amount of change from previously received sensor data, the change criteria may be indicated as a threshold amount of change from previously measured sensor data or previously transmitted sensor data. The change criteria may be a threshold rate of change over a period of time.

If the standard criteria is met (e.g., the change criteria is met or both the stability criteria and the change criteria are met) for a given sensor device, the control circuit may increment the transmission count for that sensor device by a standard count (e.g., 1) and transition to the transmit state 206. The standard count may change over time. For example, the standard count may first be set to a first value, which may increase and/or decrease over time. If the standard count is subject to changes over time, the standard count may be a function of the standard count over time (e.g., the maximum value of the standard count over time). The interval timer may be set to a null value or set to zero to cause the control circuit to transmit the message upon entering the transmit state 206 when transitioning from the idle state, as the control circuit may have already delayed transmissions for a period of time. In another example, the control circuit may set the interval timer to a predefined period of time (e.g., approximately 6 seconds) and transmit the message on the wireless network communication link at the expiration of the interval timer. The transmitted message may include an update of the measured sensor data or the amount of change in the sensor data from the previously transmitted message for each sensor device that has a transmission count greater than 1.

After transmitting the message in the transmit state 206, the control circuit may decrement the transmission count for each sensor device for which sensor data was transmitted and set the interval timer to a transmission interval, which may be a predefined period of time after a message transmission. For example, the control circuit may decrement the transmission count by one and set the interval timer to the predefined period of time of the transmission interval. The control circuit may await the predefined period time after transmission of the message at 210. At the expiration of the interval timer when in the transmit state 206, the control circuit may determine whether any sensor devices have measured sensor data to be transmitted (e.g., transmission count greater than zero). If there is no other sensor device with measured sensor data to be transmitted and no other transmission criteria are met while in the transmit state 206, the control circuit may return to the idle state 204 at 212. The control circuit may set the interval timer to the idle interval period of time and start the interval timer upon entering the idle state 204.

Other transmission criteria may be identified for causing the control circuit to increment a transmission count for a given sensor and transitioning to or remaining in the transmit state 206 for enabling transmission on the communication link. For example, the transmission criteria may include rapid response criteria may be identified to trigger the control circuit to set a transmission count for a given sensor device and transmit messages in the transmit state 206. The rapid response criteria may be used to detect a relatively greater or relatively rapid change in the measured sensor data accumulated from a given sensor, as compared to the change detected by the standard criteria to enable the sensor data to perform a more rapid control of the electrical loads communicating on a communication link in response to the rapid changes in the sensor data. The rapid response criteria may be met when the most recently measured sensor data is below a predefined threshold and/or the difference between a previously transmitted sensor data and the most recently measured sensor data is greater than one or more predefined thresholds. Accordingly, the rapid response criteria being met for a given sensor device may allow the control circuit to set the transmission count for performing transmissions of measured sensor data from the sensor device while in the transmit state 206 and transmit the sensor data to perform more rapid control of the electrical loads in response to the relatively rapid changes in the sensor data. While the rapid response criteria is described as indicating a threshold amount of change from previously received sensor data, the rapid response criteria may be indicated as a threshold amount of change from previously measured sensor data or previously transmitted sensor data. The rapid response criteria may be a threshold rate of change over a period of time.

The control circuit may determine that the rapid response criteria is met when the most recently received sensor data for a respective sensor is below a predefined threshold and/or the difference between previously transmitted sensor data for that sensor device from the control circuit and the most recently received sensor data for that sensor device is greater than one or more predefined thresholds. For example, when the type of sensor device from which the sensor data is received is a daylight sensor, the control circuit may determine that the rapid response criteria is met when the most recently received sensor data for the daylight sensor is below 5 foot-candles and/or the difference between a previously transmitted sensor data for the daylight sensor and the most recently received sensor data for the sensor device is greater than 10 foot-candles and/or greater than a 20% change (e.g., increase or decrease).

When the rapid response criteria is met for a given sensor device, the control circuit may set the transmission count for that sensor device to a rapid response count (e.g., 11) in an attempt to control the electrical loads in response to the rapid changes in sensor data over the course of a series of transmissions. As described herein, the transmission count of a respective sensor device may indicate the number of transmissions of the sensor data measured by that sensor device to be transmitted on the communication link. The rapid response count may, for example, be a predefined count stored in memory, and may indicate the number of subsequent sensor data values for that sensor to be transmitted on the wireless network communication link. If the control circuit is not already in the transmit state 206, the control circuit may transition to the transmit state 206 for enabling transmission of the sensor data for the sensor device on the communication link. If the control circuit is already in the transmit state 206 and performing transmissions for another sensor device, the control circuit may remain in the transmit state 206 and continue transmitting messages on the communication link. The messages may include the sensor data for each sensor having a transmission count that is greater than zero.

The control circuit may wait the predefined period of time of the transmission interval at 210 after each transmission in the transmit state 206. At the expiration of the interval timer when in the transmit state 206, the control circuit may determine whether any sensor devices have measured sensor data to be transmitted (e.g., transmission count greater than zero). While any sensor device remains that has sensor data to be transmitted (e.g., transmission count greater than zero), the control circuit may remain in the transmit state 206 and continue to transmit messages for those sensor devices. If there is no other sensor device with measured sensor data to be transmitted and no other transmission criteria are met while in the transmit state 206, the control circuit may return to the idle state 204 at 212. The control circuit may set the interval timer to the idle interval period of time and start the interval timer upon entering the idle state 204.

Though FIG. 2A shows the procedure 200 that may be performed according to a state machine having two states, the control circuit may implement a state machine having more than two states for enabling transmissions on the communication link. For example, 2B is a state machine diagram illustrating an example procedure 250 (e.g., a state machine procedure) that may be executed by a control circuit according to a state machine for transitioning between three states in order to transmit messages on a communication link, such as the wireless network communication link 107 shown in FIG. 1. The procedure 250 may be executed by the control circuit of the system controller, such as the wireless system controller 111 or the wired system controller 110 shown in FIG. 1. Though the system controller may be provided as an example device on which the procedure 250, or portions thereof, may be implemented, the procedure 250, or portions thereof, may be executed by a control circuit of a sensor device transmitting messages, or another device capable of performing wired and/or wireless communications as described herein.

As shown in FIG. 2B, the control circuit may be configured to transition between a heartbeat state 254, a rapid state 256, and a backoff state 258. The procedure 250 may begin execution at 252. For example, the control circuit may begin executing the procedure 250 at 252 after the system controller is powered on. The control circuit may default to the heartbeat state 204 after being powered on. When the control circuit enters the heartbeat state 204, the control circuit may set the interval timer to the heartbeat interval period (e.g., approximately 60 minutes or randomized between approximately 60 minutes and approximately 68 minutes, as described herein).

While in the heartbeat state 254, the control circuit may monitor the interval timer and the received sensor data from each of the sensor devices to identify transmission criteria. As described herein, the transmission criteria may be met upon the expiration of the interval timer. After the expiration of the heartbeat interval period of time, the control circuit may detect that the transmission criteria has been met for one or more sensor devices. Upon expiration of the heartbeat interval period of time, the control circuit may increment the transmission count (e.g., transmission count=1) for each sensor device for which the transmission criteria has been met and may transmit a heartbeat message.

After transmission of the heartbeat message, the control circuit may decrement the transmission count for each sensor device (e.g., each sensor device for which a heartbeat message was transmitted) and transition at 262 to the backoff state 258. The backoff state may allow the control circuit to wait for the predefined period of time of a transmission interval (e.g., approximately 6 seconds) before transmitting another message or transitioning to another state after a transmission. The control circuit may set the interval timer to the predefined period of time of the transmission interval and start the interval timer upon entering the backoff state 258. The backoff state may allow the control circuit to await the predefined period of time after the transmission of each message. If no other sensor devices have sensor data to be transmitted and no other transmission criteria are met for a sensor device at the expiration of the interval timer when in the backoff state 258, the control circuit may transition to the heartbeat state 254 at 268. Upon entering the heartbeat state 254, the control circuit may set the interval timer to the heartbeat interval period of time and start the interval timer for another potential heartbeat message transmission for each of the sensor devices.

As described herein, the control circuit may similarly monitor received sensor data that is accumulated to identify whether the standard criteria or rapid response criteria is met. If the standard criteria is met based on the measured sensor data for a given sensor device, the transmission count may be incremented for that sensor device. The control circuit may transmit a message with the measured sensor data for that sensor and decrement the sensor count for that sensor device after the transmission. After the transmission of the message, the control circuit may set the interval timer to the predefined period of time of the transmission interval and start the interval timer upon entering the backoff state 258.

The control circuit may also monitor the received sensor data that is accumulated to identify whether the rapid response criteria is met. If the rapid response criteria is met based on the measured sensor data for a given sensor device, the transmission count may be set for that sensor device to the rapid response count (e.g., 11). Upon detection of the rapid response criteria being met for a given sensor device, the control circuit may transition to the rapid state 256 at 260. The control circuit may transmit a message for each sensor device that has a transmission count that is greater than 1 in the rapid state 256. After each transmission, the control circuit may decrement the transmission count for each sensor device for which sensor data has been transmitted and transition to the backoff state 258 at 264. The state machine may, alternatively, stay in the rapid state 256 until the transmission count for each sensor device is less than 1. In such an implementation, the state machine may transition to the backoff state 258 at 264, after the transmission count for each sensor device is less than 1.

In the backoff state 258, or after each transmission in the rapid state 256, the control circuit may await the predefined period of the transmission interval. If in the backoff state 258 and there are additional sensor devices with a remaining transmission count after identifying rapid response criteria and/or the rapid response criteria is otherwise met, the control circuit may return to the rapid state at 266. After the transmission of the message, the control circuit may set the interval timer to the predefined period of time of the transmission interval and start the interval timer upon entering the backoff state 258.

Figures 3A, 3B:
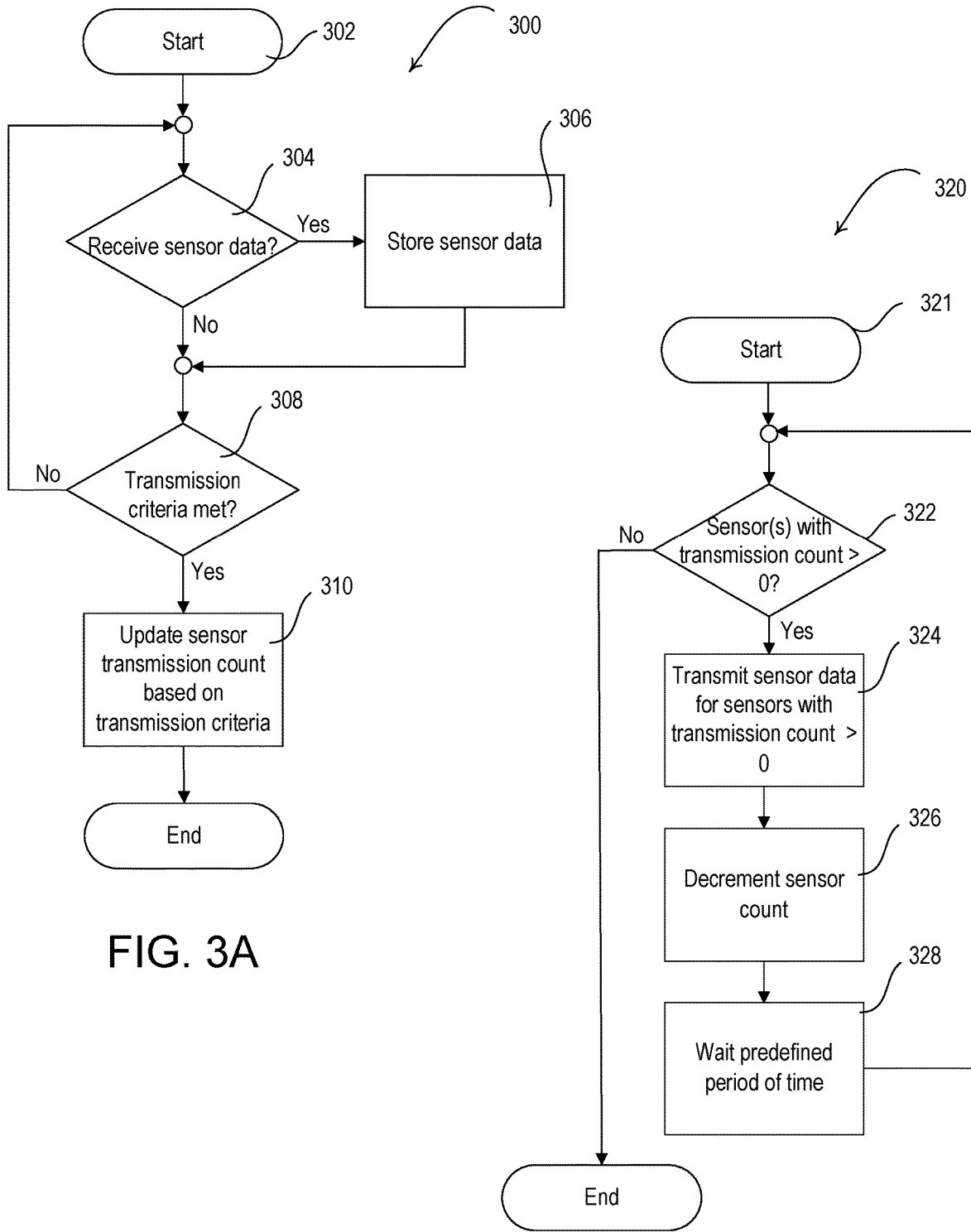
FIG. 3A is a flowchart illustrating an example procedure for aggregating sensor data for being transmitted on a communication link.
FIG. 3B is a flowchart illustrating an example procedure for transmitting sensor data on the communication link.

FIGS. 3A and 3B illustrate example procedures 300, 320 for aggregating sensor data for being transmitted on a communication link and transmitting the sensor data on the communication link, respectively. The procedures 300, 320 may be performed by a system controller (e.g., the wired system controller 110 and/or the wireless system controller 111 of FIG. 1). Though the procedures 300, 320 may be described as being performed by a system controller, another control device (e.g., lighting control device, sensor device, or other control device) in the load control system may perform the procedures 300, 320, or one or more portions thereof. The procedures 300, 320 may be stored in memory as computer-readable or machine-readable storage media that may be executed by a control circuit of one or more devices for executing the procedures. The procedures 300, 320 may be performed in parallel to allow sensor data to be aggregated using the procedure 300, while sensor data is being transmitted using the procedure 320.

As shown in FIG. 3A, the procedure 300 may begin at 302. For example, the control circuit of the system controller may begin executing the procedure 300 upon receipt of measured sensor data in a message or at the expiration of an interval timer. As described herein, the sensor data may be transmitted (e.g., originally transmitted) by a sensor device (e.g., the wired daylight sensor 166 and/or the wireless daylight sensor 156), and may be used for controlling one or more electrical devices on the wireless network communication link (e.g., the lighting devices 170, 172). At 304, the control circuit may determine whether sensor data has been received. When sensor data is received at 304, the control circuit may store the received sensor data in memory at 306. The sensor data may be received at 304 from different sensor devices and stored in the memory at 306 with a unique identifier of the sensor device from which the sensor data has been received. The control circuit may continue to aggregate sensor data from different sensors for being transmitted in response to transmission criteria being met.

At 308, the control circuit may determine whether transmission criteria has been met for at least one sensor device. The transmission criteria may comprise an expiration of the interval timer (e.g., expiration of idle or heartbeat interval period). The transmission criteria may comprise the standard criteria and/or the rapid response criteria, as described herein. When the transmission criteria is determined not to have been met for at least one sensor device, the procedure 300 may return to 304 and the control circuit may continue to monitor sensor data or the expiration of the interval timer for whether transmission criteria is met.

In response to the transmission criteria being met at 308, the control circuit may update a transmission count for the senor device that meets the transmission criteria at 310. The control circuit may aggregate sensor data and/or update the sensor transmission count for a sensor in any state. For example, the control circuit may aggregate and/or update the sensor transmission count when in an idle state or a transmit state when implementing a two-state machine. The control circuit may aggregate and/or update the sensor transmission count when in a heartbeat state, a rapid response state, and/or a backoff state when implementing a three-state machine. In response to the expiration of the idle interval period or the heartbeat interval period, the control circuit may update the transmission count (e.g., incremented to 1) for each sensor device for which the idle interval period or the heartbeat interval period has expired and store the updated transmission count in memory. The transmission count may be incremented by the same amount or a different amount in response to the expiration of the idle or heartbeat interval period or an identification that the standard criteria has been met by the received sensor data. In response to determining that the rapid response criteria has been met, the control circuit may update the transmission count (e.g., incremented by 11) for each sensor device for which the rapid response criteria has been met and store the updated transmission count in memory. The transmission count may be increased by a greater number in response to the rapid response criteria than the transmission count is increased in response to the standard criteria or the expiration of the idle or heartbeat interval period. This may allow for transmission of a series of messages comprising updates to the sensor data for a given sensor device when the rapid response criteria is met to allow for faster control of the electrical loads.

The control circuit may continue to update the transmission count for each of the sensor devices when the transmission criteria is met. In addition, the control circuit may transmit messages that include the sensor data for each of the sensor devices with a transmission count above a threshold (e.g., greater than one). FIG. 3B shows an example procedure 320 for transmitting the stored sensor data on the communication link for sensor devices with a transmission count above a threshold. As shown in FIG. 3B, the procedure 320 may begin at 321. For example, the procedure 320 may begin at 321 after a transmission count for a sensor has been updated. At 322, the control circuit of the system controller may identify whether one or more sensor devices have a transmission count greater than a threshold (e.g., zero). When there are one or more sensors that are identified with a transmission count of greater than zero, the control circuit may transmit the sensor data at 324 for each of the sensor devices having a transmission count that is greater than zero. For example, the control circuit may generate a message that comprises the measured sensor values currently stored for each of the sensor devices that have a transmission count greater than zero. The message may allow for the aggregation of measured sensor data received by the control circuit for transmission in a single message. As described herein, the control circuit may receive sensor data from multiple sensors (e.g., up to 30) and aggregate the sensor data in messages. The control circuit may transmit the message for controlling one or more electrical loads at 324. After transmitting the message at 324, the control circuit may decrement the sensor count at 326 for each of the sensor devices for which sensor data was transmitted and store the updated sensor count in memory. After the transmission, the control circuit may wait a predefined period of time at 328 (e.g., a transmission interval of approximately 6 seconds) before transmitting another message or setting the interval timer (e.g., to a heartbeat interval period of time).

If there are additional sensor devices with a transmission count greater than zero, the control circuit may identify those sensor devices at 322 after the expiration of the predefined period of time and generate another message for transmission. For example, when the rapid response criteria are met for a sensor device, the transmission count for the sensor device may be set to a predefined value greater than one to allow for transmission of a series of messages. The control circuit may generate each message using the sensor data that has been stored at 306 for the sensor device in the procedure 300 of FIG. 3A. As the rapid response criteria may detect relatively rapid changes in the measured sensor data, the stored sensor data 306 may change over the series of messages that are generated and transmitted at 324. This may allow for control of an electrical load in response to these changes in the sensor data over the series of messages. The transmission count may change for a given sensor device during the predefined period of time 328 to allow for additional sensor data to be transmitted at 324. If there are no sensors with an additional transmission count that is greater than the threshold (e.g., zero), the procedure 320 may end.

When a state machine is implemented at the system controller, different states may be used by the control circuit of the system controller for executing one or more portions of the procedures 300, 320. For example, according to a state machine having an idle state and a transmit state, the control circuit may enter or remain in the transmit state at 322 of the procedure 320 when one or more sensor devices are identified with a transmission count greater than zero. When none of the sensor devices are identified with a transmission count that is greater than zero, the control circuit may revert to the idle state for awaiting the expiration of a idle interval period or identification of other transmission criteria in the received sensor data. The control circuit may receive sensor data at 304 and store sensor data at 306 in either the transmit state or the idle state. When the transmission criteria are met at 308, the control circuit may transition from the idle state to the transmit state or remain in the transmit state for performing transmission of one or more messages on the communication link.

In another example, the state machine may have the heartbeat state, a rapid state, or a backoff state. The control circuit may receive sensor data at 304 and store the sensor data at 306 in any of these states. The control circuit may enter the rapid state when the rapid response criteria are met at 308 and/or sensor devices are identified at 322 with a transmission count above a threshold (e.g., greater than 1). The control circuit may enter the heartbeat state when there are no sensor devices with a transmission count that is greater than zero and may transmit a heartbeat message if the heartbeat interval period expires. After each transmission, the control circuit may transition to the backoff state to await the predefined period of time of each transmission interval.

Figure 4:
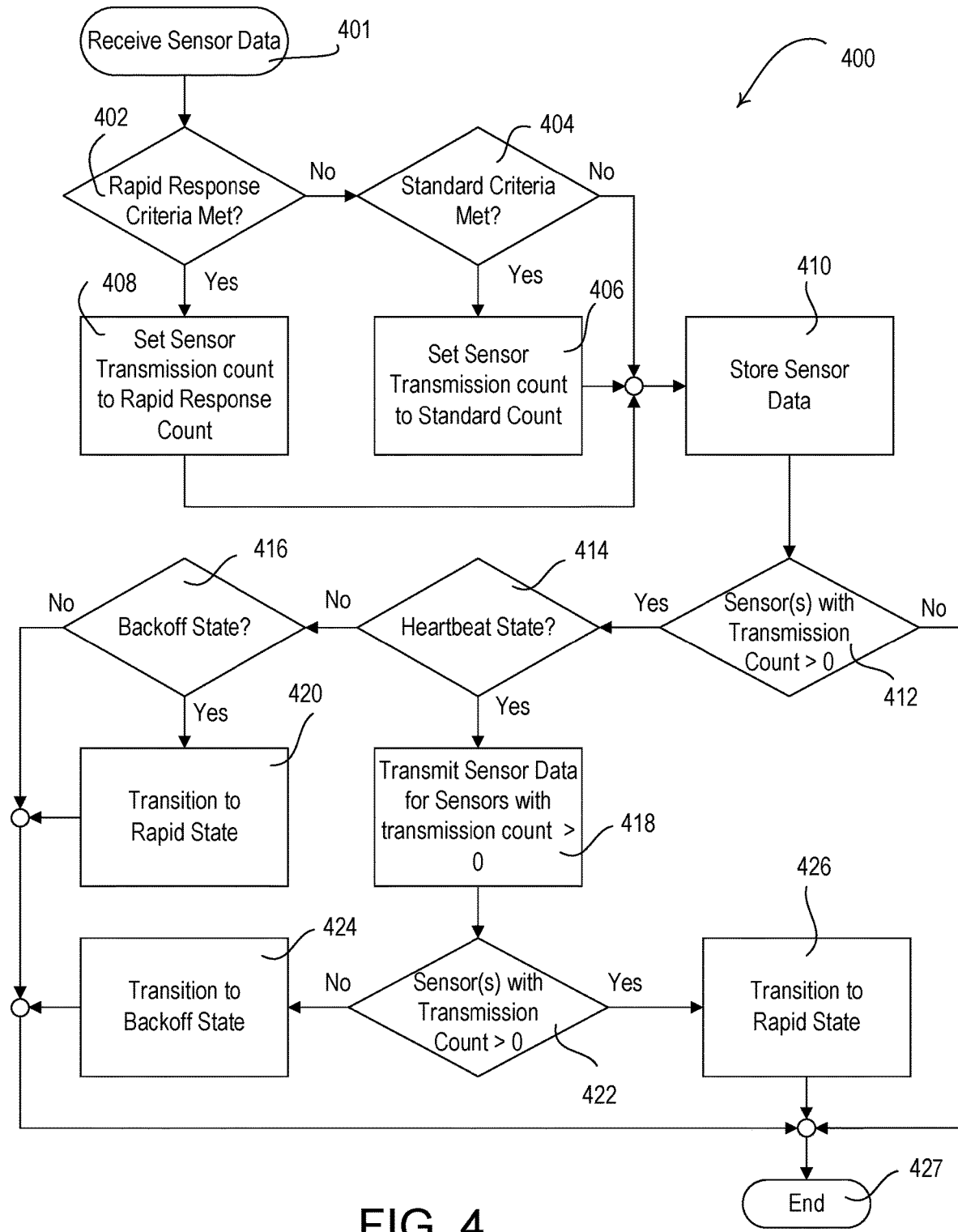
FIG. 4 is a flowchart of an example procedure that may be performed in response to receiving messages from one or more sensors.

FIGS. 4-6C illustrate examples associated with a system controller (e.g., a wireless system controller, such as the wireless system controller 111 in FIG. 1) receiving data from one or more sensors, transitioning between the various states based on received sensor data, and/or packaging and periodically transmitting the sensor data to devices via a wireless network communication link (e.g., the wireless network communication link 107 in FIG. 1) based on its respective state. FIG. 4 illustrates an example procedure 400 that may be performed by a system controller (e.g., the wired system controller 110 and/or the wireless system controller 111 of FIG. 1). Though the procedure 400 may be described as being performed by a system controller, another control device (e.g., lighting control device, sensor device, or other control device) in the load control system may perform the procedure 400, or one or more portions thereof. Additionally, though the procedure 400 may be described as being performed by a single device, the procedure 400 or portions thereof may be distributed across multiple devices (e.g., multiple system controllers, a system controller and a control device, multiple control devices, or other devices in the load control system). The procedure 400 may be stored in memory as computer-readable or machine-readable storage media that may be executed by a control circuit of the system controller or one or more other devices for executing the procedure.

As illustrated in FIG. 4, the procedure 400 may begin at 401 in response to the control circuit of the system controller receiving a message that includes sensor data. As described herein, the sensor data may be transmitted (e.g., originally transmitted) by a sensor device (e.g., the wired daylight sensor 166 and/or the wireless daylight sensor 156), and may be used for controlling one or more electrical devices on the wireless network communication link (e.g., the lighting devices 170, 172). The control circuit may determine whether to transmit the sensor data on the wireless network communication link based on a transmission criteria. For example, the control circuit may determine whether the rapid response criteria is met or the standard criteria is met for enabling different types of transmissions on the wireless network communication link.

As described herein, the transmission criteria may be a predefined criteria that accounts for the varying frequency at which messages that include sensor data may be received by the control circuit and/or whether changes in the sensor data are appreciable (e.g., whether changes in the sensor data reach or exceed a threshold level to trigger a change in control of a device coupled to the wireless network communication link). Accordingly, the control circuit may determine whether the rapid response criteria is met at 402. For example, the control circuit may determine that the rapid response criteria is met when the most recently received sensor data for a respective sensor is below a predefined threshold and/or the difference between a previously transmitted sensor data for that sensor device and the most recently received sensor data is greater than one or more predefined thresholds. For example, when the type of sensor device from which messages are received is a daylight sensor, the control circuit may determine that the rapid response criteria is met when the most recently received sensor data for the daylight sensor is below 5 foot-candles and the difference between a previously transmitted sensor data for the daylight sensor and/or the most recently received sensor data for the sensor is greater than 10 foot-candles and/or greater than a 20% change (e.g., increase or decrease).

As described herein, when the rapid response criteria is met, the control circuit may determine to transmit the received sensor data on the wireless network communication link. In addition, the control circuit may determine to transmit a number of subsequent sensor data values for the sensor device. Accordingly, if the control circuit determines that the rapid response criteria is met, the control circuit may set the transmission count for that sensor device to a rapid response count (e.g., 11) and store the transmission count in memory at 408. As described herein, the transmission count of a respective sensor device may indicate the number of transmissions of the sensor data measured by that sensor device to be transmitted on the wireless network communication link. The rapid response count may, for example, be a predefined count stored in memory at the system controller, and may indicate the number of subsequent sensor data values for that sensor to be transmitted on the wireless network communication link.

Similarly, the control circuit may determine whether a standard criteria is met at 404 when in the heartbeat state. For example, the standard criteria may be defined at the control circuit for transmitting messages differently on the wireless network communication link. The standard criteria may include a threshold amount of change in the sensor data that is less than the threshold amount of change in the rapid response criteria. The standard criteria may be used to define a stable period of time in which sensor data in the messages being received from the sensors is relatively stable. The standard criteria may prevent the transmission of messages on the wireless network communication link when the sensor data is relatively stable, and allow for transmission when a threshold amount of change in the sensor data is detected.

In an example, the control circuit may determine that the standard criteria is met when the received sensor data indicates that a change criteria or both a stability criteria and a change criteria are met for that sensor device, as described herein. The stability criteria may identify the stable periods of sensor data received from a sensor device at the system controller, and prevent transmission of sensor data when the data does not indicate a stable period. The change criteria may identify when a threshold amount of change in the sensor data received from a sensor device at the system controller is exceeded and allow transmission of the sensor data when the threshold amount of change is exceeded.

The stability criteria may be met at the system controller when the lowest sensor data received by the control circuit from a given sensor device and the highest sensor data received by the control circuit from a given sensor device over a predefined period of time are within a predefined range of each other. For example, the stability criteria may be met when the lowest measured and the highest measured sensor data over the predefined period of time are within 10% of each other, or are within a predefined value of each other. Referring again as an example to a wireless daylight sensor, the stability criteria may be met when the lowest daylight levels and the highest daylight levels received from the daylight sensor over the predefined period of time are within 10% of each other, or are within two foot-candles of each other.

The change criteria may be met at the system controller when a most recently received sensor data from a sensor device and/or the change is sensor data is greater than or equal to one or more predefined thresholds from the previously reported sensor data. For example, the control circuit may determine that the change criteria is met when a current value in the daylight levels received from a daylight sensor has changed by greater than or equal to 15% and/or is greater than or equal to a predefined amount, such as two footcandles, from the previously reported sensor data.

If the standard criteria is met (e.g., the change criteria is met or both the stability criteria and the change criteria are met), the control circuit may set the transmission count for that sensor device to a standard count (e.g., 1) at 406. The standard count may change over time. For example, the standard count may first be set to a first value, which may increase and/or decrease over time. If the standard count is subject to changes over time, the standard count may be a function of the standard count over time (e.g., the maximum value of the standard count over time). As further described herein, the transmission count for a given sensor device being greater than zero may cause the control circuit to transmit the sensor data received from that sensor device to the control devices on the wireless network communication link (e.g., tag the sensor data for transmission on the wireless network communication link). At 410, the control circuit may store the sensor data received from the sensor device in memory. As described herein, the control circuit may maintain the sensor data it receives from the one or more sensor devices in communication with the system controller and/or whether sensor data for a respective sensor device has been transmitted on the wireless network communication link. In addition, the maintained sensor data may be used to determine whether the transmission criteria is met for a respective sensor device.

As described herein, the control circuit may receive sensor data from multiple sensor devices (e.g., up to approximately 30). And at 412, the control circuit may determine whether any of the sensor devices that transmit sensor data to the system controller have a transmission count greater than zero (e.g., whether sensor data from any sensor device is tagged for transmission on the wireless network communication link). If the control circuit determines that there is no sensor device with a transmission count greater than zero (e.g., sensor data is not tagged for transmission on the wireless network communication link), the procedure 400 may end at 427. If, however, the control circuit determines that there is a sensor devices with a transmission count greater than zero (e.g., sensor data for one or more sensor devices is tagged for transmission on the wireless network communication link), the control circuit may determine whether to immediately transmit the sensor data that is received or await a predefined interval prior to transmission. For example, if the control circuit determines that it is in the heartbeat state at 414, the control circuit may transmit a message including the received sensor data to sensor devices having a transmission count greater than zero at 418 without waiting a predefined interval prior to transmission. The control circuit may transmit the message when in the heartbeat state, as the control circuit has awaited a period of time without transmission before entering the heartbeat state. As such, there is less of a chance of interference in allowing the control circuit to transmit messages via the RF signals. The control circuit may also decrement the transmission count of the sensor devices for which it transmits sensor data at 418.

At 422, the control circuit may determine whether any sensors have a transmission count greater than zero (e.g., sensor data from one or more sensor devices are tagged for transmission on the wireless network communication link). If a sensor does not have a transmission count greater than zero, the control circuit may transition to the backoff state at 424. The control circuit may transition to the backoff state at 424 after transmission of the sensor data at 418 and because there are no additional sensor devices with a transmission count greater than zero. The backoff state may allow for receipt and/or aggregation of additional messages from sensor devices for being subsequently transmitted during the rapid state and prior to transition to the heartbeat state. If the state machine being implemented is a two-state machine having an idle state and a transmit state, or otherwise fails to have a backoff state, the control circuit may await the predefined period of time of the transmission interval after the transmission in the transmit state.

If, however, a sensor device does have a transmission count greater than zero (e.g., sensors are still tagged for transmission), the control circuit may transition to the rapid state at 426, allowing the control circuit to account for and transmit sensor data that the control circuit has determined to subsequently transmit from the sensor device (e.g., due to the sensor device meeting the rapid response criteria). Again, if the state machine being implemented is a two-state machine having an idle state and a transmit state, or otherwise fails to have a rapid state, the control circuit may remain in the transmit state for performing subsequent transmissions comprising sensor data from the sensor device (e.g., due to the sensor device meeting the rapid response criteria).

If the control circuit is not in the heartbeat state at 414, the control circuit may determine whether it is the backoff state at 416. If the control circuit is in the backoff state at 416, the control circuit may transition to the rapid state at 420, and the procedure 400 may end at 427. The control circuit may transition to the rapid state at 420 to allow for transmission of the sensor data received and/or aggregated while the control circuit was in the backoff state. The control circuit may operate in the rapid state as described herein. Again, if the state machine being implemented is a two-state machine having an idle state and a transmit state, or otherwise fails to have a rapid state, and the control circuit determines that sensor devices have a transmission count of greater than zero at 412, the control circuit may remain in the transmit state for transmission of the sensor data received and/or aggregated therein.

Figure 5:
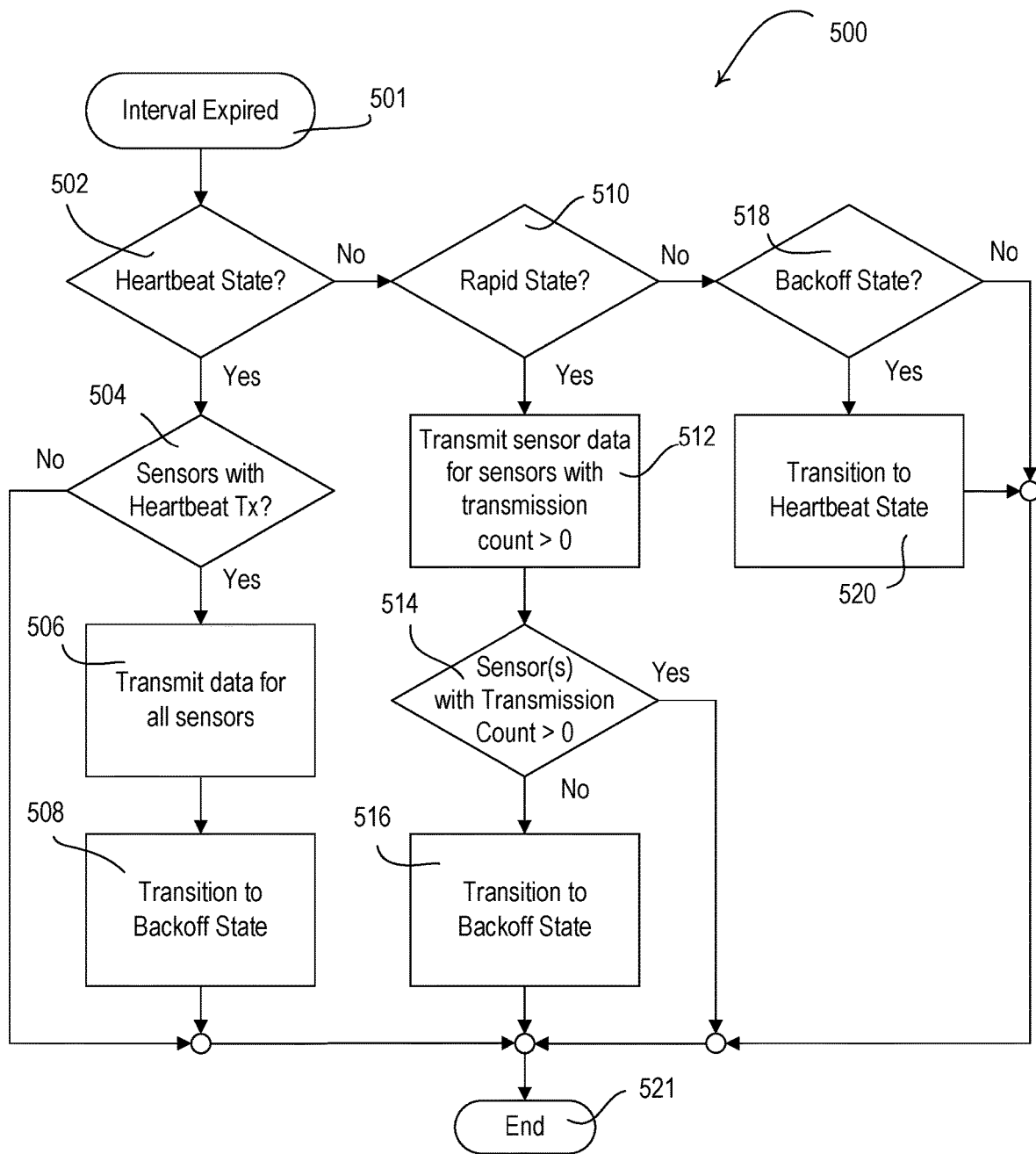
FIG. 5 is a flowchart of an example procedure that may be performed in response to an expiration of an interval timer.

FIG. 5 illustrates an example procedure 500 that may be performed by a system controller (e.g., the wired system controller 110 and/or the wireless system controller 111 in FIG. 1). Though the procedure 500 may be described as being performed by a wireless system controller, another control device (e.g., lighting control device, sensor device, or other control device) in the load control system may perform the procedure 500, or one or more portions thereof. Additionally, though the procedure 500 may be described as being performed by a single device, the procedure 500 or portions thereof may be distributed across multiple devices (e.g., multiple system controllers, a system controller and a control device, multiple control devices, or other devices in the load control system). The procedure 500 may be stored in memory as computer-readable or machine-readable storage media that may be executed by a control circuit of the system controller or one or more other devices for executing the procedure.

As illustrated in FIG. 5, the procedure 500 may begin at 501 in response to an expiration of an interval timer. The interval timer may be implemented to separate transmissions on the second communication link (e.g., the wireless communication link that utilizes the RF signals 107 in FIG. 1) by at least the interval time. The implementation of the interval timer may allow for the control circuit to aggregate sensor data from multiple sensors for being transmitted in the same message on the wireless network communication link. In addition, implementation of the interval timer may allow for the system controller to transmit the sensor data received from sensors to devices communicating on the wireless network communication link. The interval timer may be set to an idle interval period of time or a heartbeat interval period of time. The interval timer may be set to a transmission interval. For example, the interval timer may expire periodically (e.g., approximately every 6 seconds) and the control circuit may transmit the sensor data that is aggregated over the interval timer period. The operation of the control circuit at the expiration of the interval at 501 may change based on the state of the control circuit at the time of expiration.

At 502, the control circuit may determine whether it is in the heartbeat state when the interval timer expires. If the control circuit is in the heartbeat state when the interval timer expires, the control circuit may determine whether a heartbeat interval period of time has expired at 504. As described herein, the heartbeat interval may include a period of time over which the sensor data for each of the sensor devices in communication with the system controller is to be transmitted (e.g., approximately 60 minutes). In addition, the heartbeat interval period of time may ensure that sensor data for each of the sensor devices in communication with the system controller is transmitted at least once during a given heartbeat interval (e.g., which may assist in keeping the sensor data for each of the sensor devices synchronized with the control devices on the wireless communication network). If the control circuit determines that the heartbeat interval has expired, the control circuit may transmit the sensor data for each (e.g., all) of the sensor devices from which it receives sensor data wireless network communication link at 506. This may allow the sensor data to be synchronized across each of the sensor devices for the control devices on the wireless network communication link. For example, in certain situations, the sensor data for a given sensor device may become out of sync or stale for a control device on the wireless communication link (e.g., if the control device powers on/off and/or misses a previous transmission that include sensor data for that sensor device). In these types of scenarios, the heartbeat transmission mays allow the sensor data for that sensor device to become synchronized with the control device on the wireless communication link (e.g., such that the control device is aware of the current sensor data for that sensor device). After transmitting the sensor data for each of the sensor devices from which it receives sensor data on the wireless communication network link at 506, the control circuit may transition to the backoff state at 508. If the control circuit determines that the heartbeat interval has not expired, the procedure 500 may exit at 521.

At 510, the control circuit may determine whether it is in the rapid state when the interval timer expires. As described herein, if the control circuit is in the rapid state when the interval timer expires, the control circuit may initiate a transmission on the wireless network communication link that includes the aggregated sensor data for the sensor devices having a transmission count greater than zero at 512 (e.g., sensor devices with a transmission count greater than zero). In addition, the control circuit may decrement the transmission count of the sensor devices for which it has transmitted a sensor data on the wireless network communication link at 512. At 514, the control circuit may determine whether any of the sensor devices that transmit sensor data to the control circuit have a transmission count greater than zero (e.g., whether sensor data from any sensor device is tagged for transmission on the wireless network communication link. If the control circuit determines that there are one or more sensor devices with a transmission counter greater than zero (e.g., there are sensor devices with sensor data tagged for transmission on the wireless network communication link), the procedure 500 may exit at 521. If, however, the control circuit determines that there is no sensor with a transmission count greater than (e.g., sensor data is not tagged for transmission on the wireless network communication link), the control circuit may transition to the backoff state at 516, and the procedure 500 may end at 521. The control circuit may transition to the backoff state at 516 after transmission of the sensor data at 512 and because there are no additional sensor devices with a transmission count greater than zero. The backoff state may allow for receipt and/or aggregation of sensor data from sensor devices for being subsequently transmitted during the rapid state and prior to transition to the heartbeat state.

At 518, the control circuit may determine whether it is in the backoff state when the interval timer expires. If the control circuit is in the backoff state when the interval timer expires, the control circuit may transition to the heartbeat state at 520 and the procedure 500 may end at 521. The control circuit may remain in the heartbeat state until a subsequent received message includes sensor data for being transmitted on the wireless network communication link.

Figure 6A:
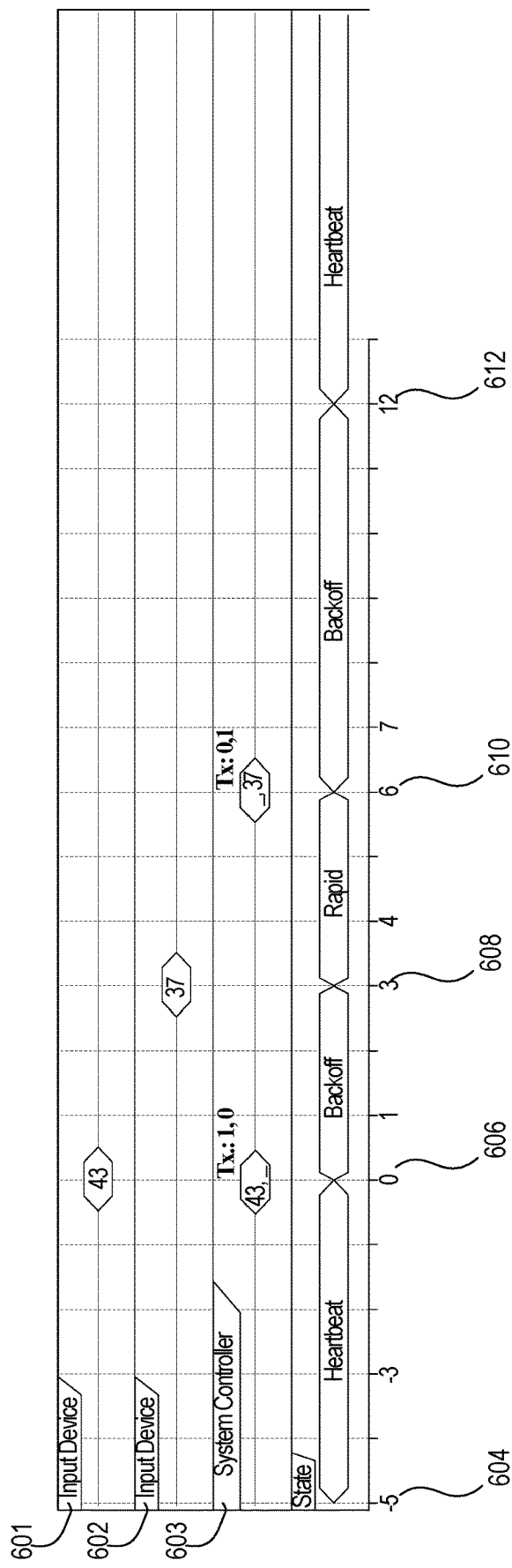
FIG. 6A is a message timing diagram illustrating example messages communicated between devices in a network.
Figure 6B:
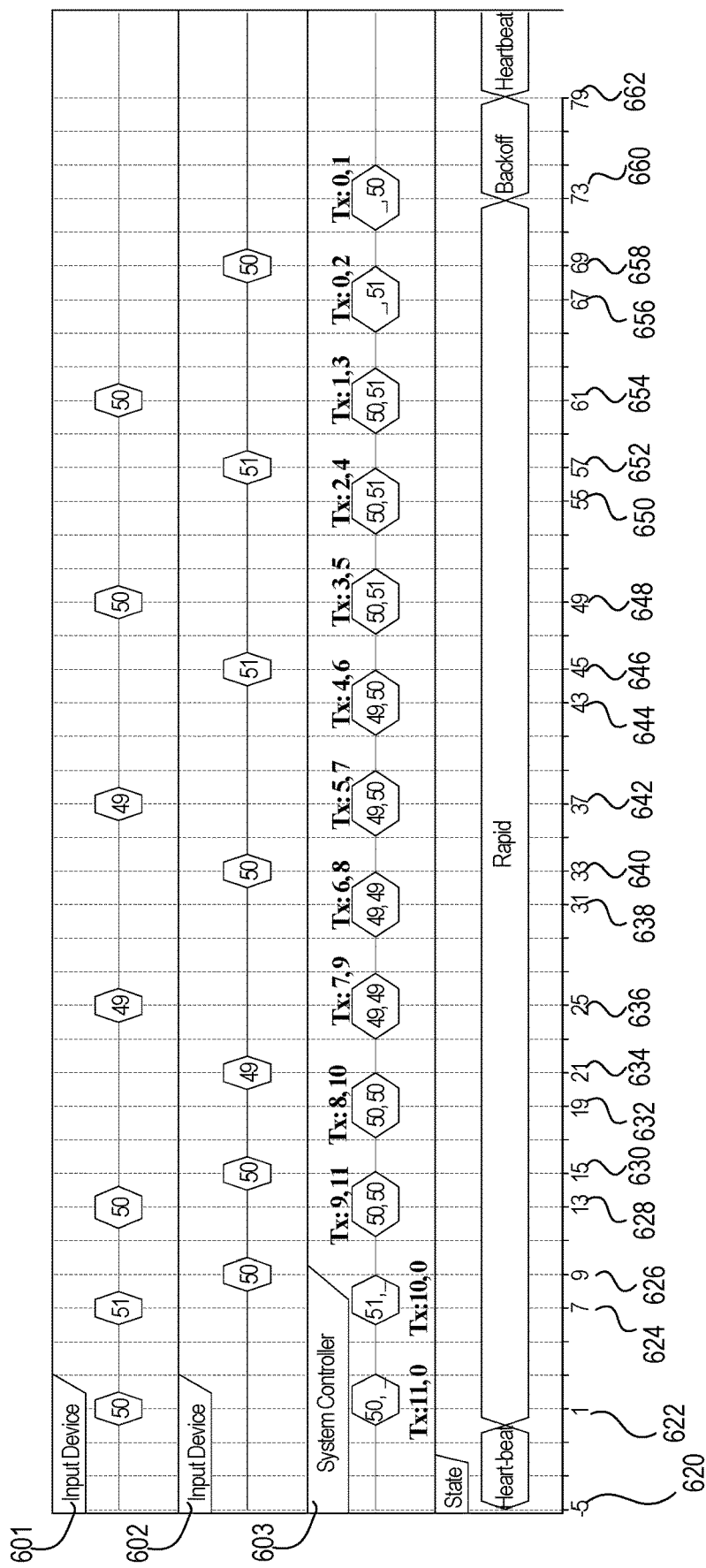
FIG. 6B is another message timing diagram illustrating example messages communicated between devices in a network.
Figure 6C:
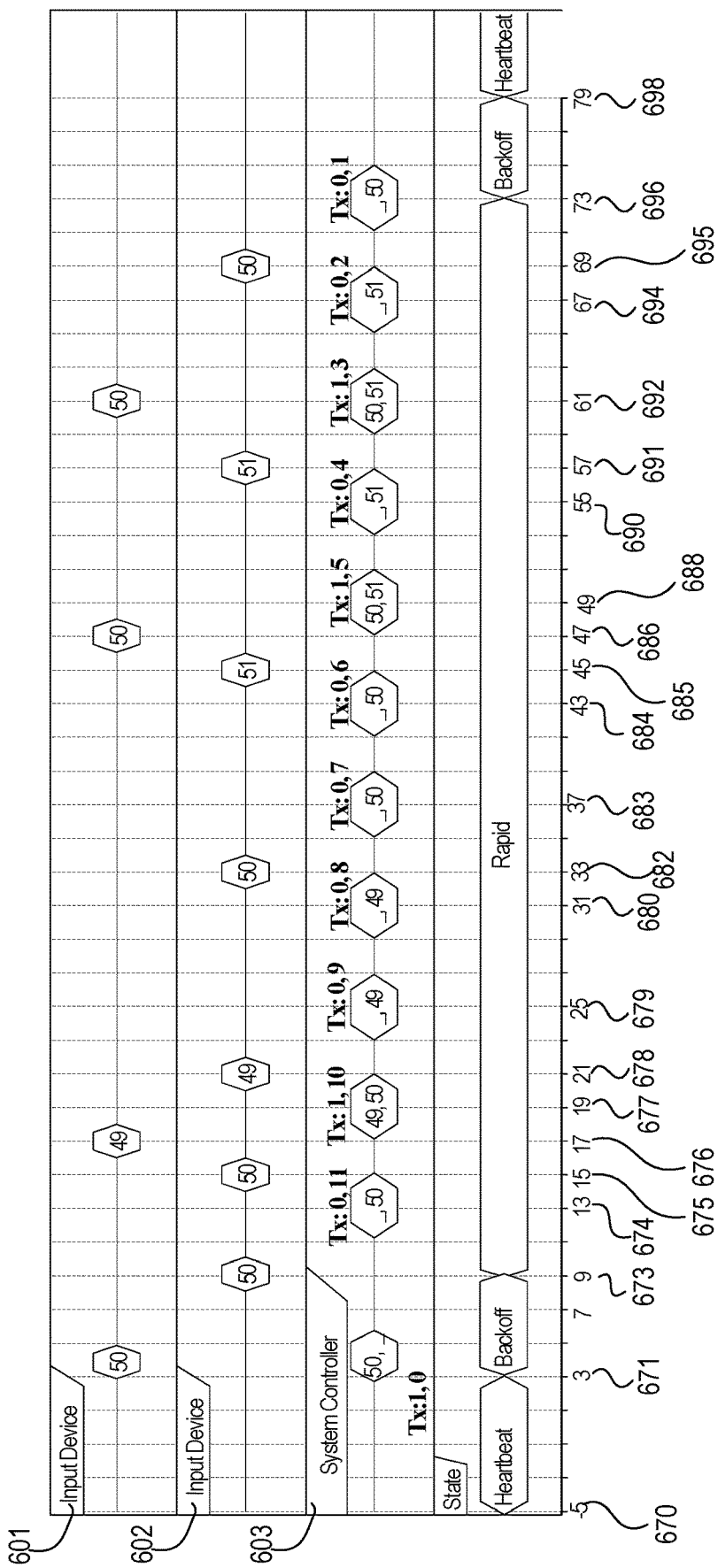
FIG. 6C is yet another message timing diagram illustrating example messages communicated between devices in a network.

FIGS. 6A-6C are timing diagrams illustrating example messages communicated between input devices 601, 602 and a system controller 603 (e.g., the wireless system controller 111 shown in FIG. 1). Although the timing diagrams of FIGS. 6A-6C illustrate examples with a state machine having three states, state machines having different number of states may also be implemented. For example, as described herein and shown in FIG. 2A, state machines having two states may be implemented. The input devices 601, 602 may be sensor devices, such as the daylight sensors 156, 166, temperature sensors, color temperature sensors, or another type of sensor. The input devices 601, 602 may be on a first communication link (e.g., such as the wired serial communication link 104 and/or the wireless input-device communication link 106 in FIG. 1). The system controller 603 may be configured as an intermediary device between the input devices on the first communication link and control devices on a wireless network communication link (e.g., such as the wireless network communication link 107 in FIG. 1). The system controller 603 may be configured to transmit a message including sensor data received from input devices 601, 602 to control devices (e.g., such as the lighting devices 170, 172 in FIG. 1) on the wireless network communication link (e.g., for controlling respective electrical loads, such as the lighting loads of the lighting devices 170, 172).

In order to transmit messages from the input devices 601, 602 on the wireless network communication link, the wireless system controller 603 may operate in one of a plurality of states. As described herein, the plurality of states may include a heartbeat state, a backoff state, and/or a rapid state. As illustrated in FIGS. 6A-6C, the system controller 603 may transition between the plurality of states based on the sensor data included in messages from the input device 601,602. Again, the input devices 601, 602 may be sensors and, as described herein, may be configured to transmit messages including sensor data according to the system controller 603. In response to receiving sensor data from the input devices 601, 602, the system controller 603 may determine whether to transmit the sensor data on the wireless network communication link based on determining that transmission criteria has been met for the messages received from one of the input device 601, 602. The system controller 603 may also transition between the pluralities of states based on the respective transmission criteria met at one or more the input devices 601, 602. In addition, the system controller 603 may periodically transmit (e.g., based on the expiration of an interval timer) the sensor data received from input devices 601, 602 to one or more devices on the wireless network communication link.

Referring first to FIG. 6A, there is illustrated an example where the input devices 601, 602 transmit messages including sensor data to the system controller 603, and the system controller 603 determines to transmit the sensor data on the wireless network communication link based on a standard criteria being met. At 604, the system controller 603 may be in the heartbeat state. At 606, the system controller 603 may receive a message including sensor data (e.g., a measurement of 63) from the input device 601. In response to receiving the message from the input device 601, the system controller 603 may determine that the sensor data received at 606 is to be transmitted on the wireless network communication link based on determining that the standard criteria is met for the sensor data received from the input device 601. In addition, the system controller 603 may set the transmission count for the input device 601 to the standard message count (e.g., 1). The system controller 603 may transmit (e.g., immediately transmit at 606) a message including sensor data (e.g., a measurement of 63) on the wireless network communication link since the sensor data is received when the system controller 603 is in the heartbeat state, and decrement the transmission count for the input device 601 to zero. Since the transmission count for the input device 601 is set to zero, the system controller 603 may transition its state to the backoff state at 606. For example, the system controller 603 may transition to the backoff state because neither the input device 601 nor the input device 602 has a transmission count greater than zero after the transmission at 606. The interval timer may also expire at 606 (e.g., seconds later than 604), and the wireless system controller 603 may also forward or transmit the sensor data to one or more control devices on the wireless network communication link at 606.

As illustrated in FIG. 6A, the message transmitted at 606 on the wireless network communication link may include the sensor data of the input devices tagged for transmission. As described herein, the system controller 603 may identify the input devices tagged for transmission based on the transmission count of the respective input device being greater than zero. For example, the system controller 603 may transmit a message including the sensor data for the input device 601, but not the sensor data for the input device 602 at 606 (e.g., as the transmission count for the input device 601 is one and the transmission count for the input device 602 is zero). After transmitting the sensor data to control devices on the wireless network communication link at 606, the system controller 603 may decrement the transmission count of the respective input devices for which it transmitted sensor data (e.g., the transmission count of the input device 601, 602 may both be zero). Although the diagram of FIG. 6A shown that the sensor data for input device 601 and the messages transmitted by the system control 603 both occur at 606, it would be understood that the sensor data is first transmitted by the input device 601 and shortly thereafter (e.g., one or more clock cycles of the control circuit of the system controller 603) the messages is transmitted by the system controller 603.

At 608, the system controller 603 may receive a message including sensor data (e.g., a measurement of 37) from the input device 602. In response to the sensor data received at 608, the system controller 603 may determine to transmit the received sensor data on the wireless network communication link based on the standard criteria being met for the input device 602. In response to receiving the message, the system controller 603 may also set the transmission count for the input device 602 to one (e.g., tag the input device 601 for transmission) and transition to the rapid state (e.g., as described herein with respect to FIG. 2) at 608. The system controller 603 may transition to the rapid state for transmission of the sensor data received from the input device 602 after expiration of the time interval. At 610, the interval timer may again expire (e.g., 6 seconds later than 606 when the system controller 603 last transmitted a message), and the system controller 603 may transmit the sensor data (e.g., a measurement of 37) for the input device 602 to the control devices on the wireless network communication link.

As illustrated in FIG. 6A, the message transmitted at 610 may include the sensor data of the input devices tagged for transmission (e.g., the input device 602), which, as described herein, may be based on the transmission count of the respective input device being greater than zero. After transmitting the message at 610, however, the wireless system controller 603 may decrement the transmission count of the input device 602 and the transmission count of both input devices may become zero, which, as described herein, may cause the system controller 603 to transition to the backoff state for a period of time. At 612, the interval timer may expire yet again, and, since the system controller 603 is already in the backoff state upon expiration of the interval timer, the wireless system controller 603 may transition to the heartbeat state until a subsequent message is received.

As described herein, the example illustrated in FIG. 6A may also be implemented using a state machine having a different number of states (e.g., two states). For example, rather than transitioning between the backoff and rapid stated at 608 and 610, the state machine may stay in a single state, such as the transmit state 206 described in FIG. 2A.

Referring now to FIG. 6B, there is illustrated an example where the input devices 601, 602 transmit messages including sensor data to the system controller 603, and the system controller 603 determines to transmit the sensor data on the wireless network communication link based on the rapid response criteria being met. At 620, the system controller 603 may be in the heartbeat state. At 622, the system controller 603 may receive a message including sensor data (e.g., a measurement of 50) from the input device 601. In response to receiving the message from input device 601, the system controller 603 may determine to transmit the sensor data on the wireless network communication link based on the rapid response criteria being met. In addition, the system controller 603 may set the transmission count for input device 601 to the rapid response count (e.g., 11) and transition to the rapid state, as described herein. The interval timer may expire at 622 (e.g., 6 seconds later than 620), and the wireless system controller 603 may also forward or transmit the sensor data to one or more control devices on the wireless network communication link at 622. As illustrated in FIG. 6B, the message may include the sensor data of the input devices tagged for transmission (e.g., the input device 601 as its transmission count is greater than zero). After transmitting the sensor data to devices on the wireless network communication link, the system controller 603 may decrement the transmission count of the respective input devices for which it transmitted sensor data. For example, the transmission count of the input device 601 may be decremented to ten, while the transmission count of the input device 602 may remain zero.

As the rapid response criteria was met, the system controller 603 may determine to transmit additional messages that include subsequently measured sensor data. At 624 the system controller 603 may receive subsequently measured sensor data (e.g., a measurement of 51) from the input device 601. Again, receipt of the message at 624 may coincide with the expiration of the interval timer causing the wireless system controller 603 transmit the sensor data and decrement the transmission count of input device 601. At 626, the system controller 603 may receive a message including sensor data (e.g., a measurement of 50) from the input device 602. Again, the system controller 603 may determine to transmit the sensor data on the wireless network communication link based on the rapid response criteria being met. Accordingly, the system controller 603 may set the transmission count for the input device 602 to the rapid response count (e.g., 11). At 628, the interval timer may expire and the system controller 603 may transmit the sensor data tagged for transmission. As illustrated in FIG. 6B, for example, the input devices 601, 602 may both be tagged for transmission (e.g., the input devices 601, 602 both have a transmission count greater than zero), and the system controller 603 may transmit the respective sensor data to the control devices on the wireless network communication link.

As illustrated in FIG. 6B, the system controller may continue to receive messages including sensor data from the input devices 601, 602. For example, the system controller 603 may receive messages including sensor data from the input device 601 at 628 (e.g., measurement of 50), 636 (e.g., measurement of 49), 642 (e.g., measurement of 49), 648 (e.g., measurement of 50), and 654 (e.g., measurement of 50). The system controller 603 may receive messages including sensor data from the input device 602 at 630 (e.g., measurement of 50), 634 (e.g., measurement of 49), 640 (e.g., measurement of 50), 646 (e.g., measurement of 51), 652 (e.g., measurement of 51), and 658 (measurement of 50). Similarly, the system controller 603 may continue to transmit the sensor data to the control devices on the wireless network communication link upon the periodic expirations of the interval timer at 632, 636, 638, 642, 644, 648, 650, 654, 656, and 660. Further, as described herein, for example, with respect to FIG. 6A, although the sensor data for input device 601 and the messages transmitted by the system control 603 including said sensor data both occur at 636, it would be understood that the sensor data is transmitted by the input device 601 first, and the message is transmitted by the system controller 603 shortly thereafter. A similar situation would also arise at 642 and 654. The system controller 603 may also decrement the respective transmission counts of the input devices 601, 602 as the sensor data is transmitted until the respective transmission counts are no longer greater than zero. For example, the transmission count of the input device 601 may be decremented to zero after the system controller 603 transmits the message at 654, and the transmission count of the input device 602 may be decremented to zero after the system controller 603 transmits the message at 660. As further illustrated in FIG. 6B, after transmitting the message at 660, the transmission count of the input devices 601, 602 may be zero and, as a result, the wireless system controller 603 may also transition to the backoff state. The internal timer may expire at 662 while the system controller 603 is in the backoff state, since the system controller 603 failed to receive any messages in the backoff state, which may cause the system controller 603 to transition to the heartbeat state, as described herein.

As shown in FIG. 6B, the system controller 603 may enter the rapid state for transmission of the sensor data received from the input devices 601, 602 and remain in the rapid state for transmission of the sensor data until the transmission count of the input devices 601, 602 reaches zero. The sensor data for each input device received in the same interval may be aggregated for transmission in a single message on the wireless network communication link.

As described herein, the example illustrated in FIG. 6B may also or alternatively be implemented using a state machine having a different number of states (e.g., two states). For example, rather than transitioning from the rapid to the backoff state at 660, the state machine may stay in a single state, such as the transmit state 206 described in FIG. 2A.

Referring now to FIG. 6C, there is illustrated an example where the system controller 603 may determine to transmit sensor data from the input device 601 based on the standard criteria being met, and where the system controller 603 determines to transmit sensor data from the input device 602 based on the rapid response criteria being met. At 670, the system controller 603 may be in the heartbeat state. At 671, the system controller 603 may receive a message including sensor data (e.g., a measurement of 50) from the input device 601. In response to receiving the message from the input device 601, the system controller 603 may determine to transmit the sensor data on the wireless network communication link based on the standard criteria being met. Accordingly, the system controller 603 may set the transmission count for input device 601 to the standard count (e.g., 1) and transition to the rapid state for transmission, as described herein. Receipt of the message at 671 may also coincide with the expiration of the interval timer (e.g., 6 seconds later than 670), and the wireless system controller 603 may also transmit the sensor data to one or more control devices on the wireless network communication link at 671. As illustrated in FIG. 6C, the message may include the sensor data of the input devices tagged for transmission (e.g., input device 601 as its transmission count is greater than zero). After transmitting the sensor data to the control devices on the wireless network communication link, the system controller 603 may decrement the transmission count of the respective input devices for which it transmitted sensor data (e.g., the transmission count of the input devices 601, 602 may now be zero). At 671, the system controller 603 may transition to the backoff state for an interval since the input devices 601, 602 both have a transmission count of zero (e.g., as illustrated in FIG. 3).

At 673, the system controller 603 may receive a message including sensor data (e.g., a measurement of 50) from the input device 302. In response to receiving the message from the input device 602, the wireless system controller 603 may determine to transmit sensor data for the input device 602 on the wireless network communication link based on the rapid response criteria being met. Accordingly, the system controller 603 may set the transmission count for the input device 602 to the rapid response count (e.g., 11). At 674, the interval timer may again expire, and the system controller 603 may also transmit the sensor data received from the input device 602 to the control devices on the wireless network communication link.

As illustrated in FIG. 6C, the system controller 603 may continue to receive messages including sensor data from the input device 602. For example, the system controller 603 may receive subsequent messages including sensor data from the input device 602 at 675 (e.g., measurement of 50), 678 (e.g., measurement of 49), 682 (e.g., measurement of 50), 685 (e.g., measurement of 51), 691 (e.g., measurement of 51), and 695 (e.g., measurement of 50). The system controller 603 may continue to transmit the sensor data received from the input device 602 on the wireless network communication link at 677, 679, 680, 683, 684, 688, 690, 692, 694, and 696. The system controller 603 may also decrement the transmission count of the input device 602 as the sensor data is transmitted. For example, the transmission count of the input device 602 may be decremented to zero after the system controller 603 transmits the message including the sensor data at 696.

As further illustrated in FIG. 6C, the system controller 603 may also receive messages including sensor data from the input device 601 at 676, 686, and 692. Again, the system controller 603 may determine to transmit the received sensor data on the wireless network communication link based on the standard criteria being met. For example, in response to receiving each of these messages from the input device 601, the system controller 603 may set the transmission count for the input device 601 to the standard count (e.g., 1). The system controller 603 may aggregate the sensor data received from the input device 601 with the sensor data for the input device 602 being transmitted in the next message. The system controller 603 may decrement the transmission count of the input device 601 as it transmits the sensor data to the control devices on the wireless network communication link. For example, the transmission count for the input device 601 may be set to the standard count (e.g., 1) at 676, and subsequently decremented after sending the received sensor data at 677 (e.g., decremented to zero). The transmission count of the input device 601 may similarly be set to the standard count at 686 and 692, respectively, and subsequently decremented after transmission at 688 and 692.

After the transmitting the sensor data for the input device 601 at 696, the transmission counts of the input devices 601, 602 may both be zero, and the system controller 603 may transition to the backoff state. Upon the next expiration of the interval timer at 698, the system controller 603 may transition to the heartbeat state.

As described herein, the example illustrated in FIG. 6C may also or alternatively be implemented using a state machine having a different number of states (e.g., two states). For example, rather than transitioning between the backoff and rapid states at 673 and 696, the state machine may stay in a single state, such as the transmit state 206 described in FIG. 2A.

Figure 7:
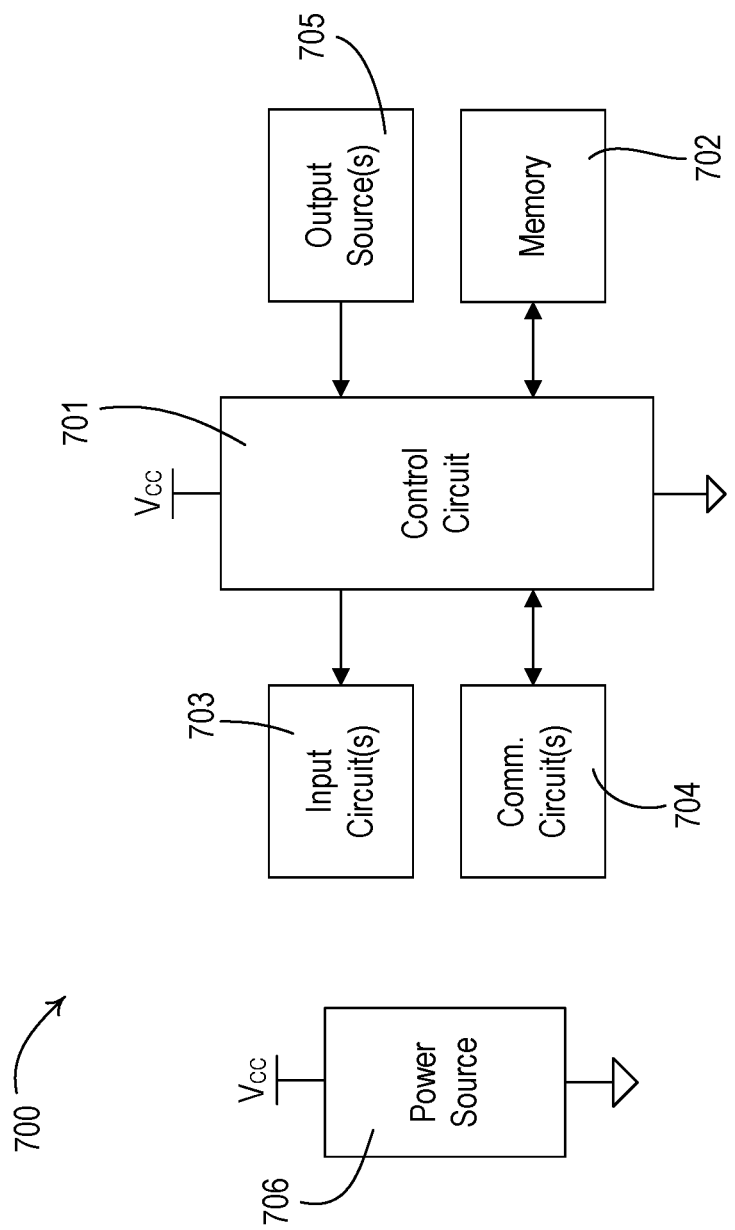
FIG. 7 is a simplified block diagram of an example device.

FIG. 7 is a block diagram illustrating an example of a device 700 capable of processing and/or communication in a load control system, such as the load control system 100 of FIG. 1. In an example, the device 700 may be a control device capable of transmitting or receiving messages. The control device may be in an input device, such as wired keypad device 150, a wired daylight sensor 166, a battery-powered remote control device 152, a wireless occupancy sensor 154, and/or a wireless daylight sensor 156 or another input device capable of transmitting messages to load control devices or other devices in the load control system 100. The device 130 may be a computing device, such as the personal computer 164, the wired system controller 110, the wireless system controller 111, or another computing device in the load control system 100. The system controller may be a gateway system controller, a target system controller, a remote system controller, and/or a combination thereof.

The device 700 may include a control circuit 701 for controlling the functionality of the device 700. The control circuit 701 may include one or more general purpose processors, special purpose processors, conventional processors, digital signal processors (DSPs), microprocessors, integrated circuits, a programmable logic device (PLD), application specific integrated circuits (ASICs), or the like. The control circuit 701 may perform signal coding, data processing, image processing, power control, input/output processing, or any other functionality that enables the device 700 to perform as one of the devices of the load control system (e.g., load control system 100) described herein.

The control circuit 701 may be communicatively coupled to a memory 702 to store information in and/or retrieve information from the memory 702. The memory 702 may comprise a computer-readable storage media or machine-readable storage media that stores computer-executable instructions for performing as described herein. When the device 700 is a system controller, sensor device, or another device configured to transmit messages as described herein, the computer-executable instructions may comprise one or more portions of the procedures 300, 320, 400, and/or 500 for performing as describe herein. The memory 702 may maintain sensor data received by the control circuit 701 and/or the state of a state machine executing on the device 700. The control circuit 701 may access the instructions from memory 702 for being executed to cause the control circuit 701 to operate as described herein, or to operate one or more devices as described herein. The memory 702 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 702 may be implemented as an external integrated circuit (IC) or as an internal circuit of the control circuit 701.

The device 700 may include one or more communication circuits 704 that are in communication with the control circuit 701 for sending and/or receiving information as described herein. The communication circuits 704 may perform wireless and/or wired communications. The communication circuits 704 may include a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 704 may be configured to communicate via power lines the power lines from which the device 130 receives power) using a power line carrier (PLC) communication technique. The communication circuits 704 may include a wireless communication circuit including one or more RF or infrared (IR) transmitters, receivers, transceivers, or other communication circuits capable of performing wireless communications.

Though a single communication circuit 704 may be illustrated, multiple communication circuits may be implemented in the device 700. The device 700 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols). In another example, the first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a wired communication link.

One of the communication circuits 704 may comprise a beacon transmitting and/or receiving circuit capable of transmitting and/or receiving beacon messages via a short-range RF signal. The control circuit 701 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 701.

The control circuit 701 may be in communication with one or more input circuits 705 from which inputs may be received. The input circuits 704 may be included in a user interface for receiving inputs from the user. For example, the input circuits 704 may include an actuator (e.g., a momentary switch that may be actuated by one or more physical buttons) that may be actuated by a user to communicate user input or selections to the control circuit 701. In response to an actuation of the actuator, the control circuit 701 may enter an association mode, transmit association messages from the device 700 via the communication circuits 704, and/or receive other information (e.g., control instructions for performing control of an electrical load). In response to an actuation of the actuator may perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 701 of the device 700 may enter the association mode, transmit an association message, transmit control instructions, or perform other functionality in response to an actuation or input from the user on the touch sensitive surface.

The input circuits 703 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 700). The control circuit 701 may receive information from the one or more input circuits 703 and process the information for performing functions as described herein.

The control circuit 701 may be in communication with one or more output sources 705. The output sources 705 may include one or more light sources (e.g., LEDs) for providing indications (e.g., feedback) to a user. The output sources 705 may include a display (e.g., a visible display) for providing information (e.g., feedback) to a user. The control circuit 701 and/or the display may generate a graphical user interface (GUI) generated via software for being displayed on the device 700 (e.g., on the display of the device 700).

The user interface of the device 700 may combine features of the input circuits 703 and the output sources 705. For example, the user interface may have buttons that actuate the actuators of the input circuits 703 and may have indicators (e.g., visible indicators) that may be illuminated by the light sources of the output sources 705. In another example, the display and the control circuit 701 may be in two-way communication, as the display may display information to the user and include a touch screen capable of receiving information from a user. The information received via the touch screen may be capable of providing the indicated information received from the touch screen as information to the control circuit 701 for performing functions or control.

Each of the hardware circuits within the device 700 may be powered by a power source 706. The power source 706 may include a power supply configured to receive power from an alternating-current (AC) power supply or a direct-current (DC) power supply, for example. In addition, the power source 706 may comprise one or more batteries. The power source 706 may produce a supply voltage $V_{CC}$ for powering the hardware within the device 700.

Figure 8:
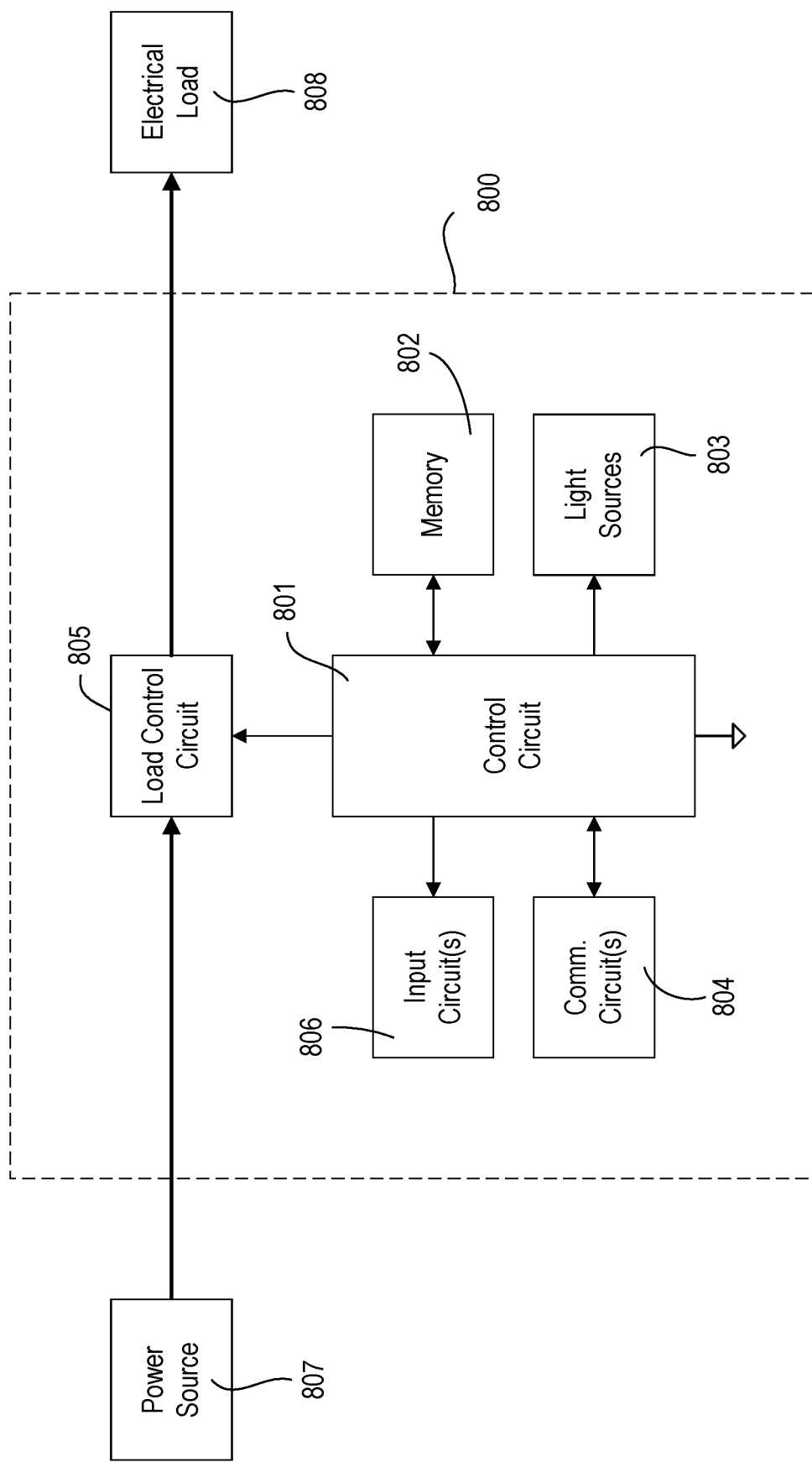
FIG. 8 is a simplified block diagram of an example load control device.

FIG. 8 is a block diagram illustrating an example load control device 800. The load control device 800 may be a lighting control device (e.g., the light-emitting diode (LED) drivers 130, for controlling or driving respective electrical load, such as LED light sources 132, and/or lighting devices 170, 172) or a daylight control device, such as a motorized window treatment (e.g., the motorized roller shades 140), a plug-in load control device, a temperature control device, a dimmer switch, an electronic switch, an electronic ballast for lamps, and/or another load control device.

The load control device 800 may include a control circuit 801 for controlling the functionality of the load control device 800. The control circuit 801 may include one or more general purpose processors, special purpose processors, conventional processors, digital signal processors (DSPs), microprocessors, integrated circuits, a programmable logic device (PLD), application specific integrated circuits (ASICs), or the like. The control circuit 801 may perform signal coding, data processing, image processing, power control, input/output processing, or any other functionality that enables the load control device 800 to perform as one of the devices of the load control system (e.g., load control system 100) described herein.

The load control device 800 may include a load control circuit 805 that may be electrically coupled in series between a power source 807 (e.g., an AC power source and/or a DC power source) and an electrical load 808. The control circuit 801 may be configured to control the load control circuit 805 for controlling the electrical load 808, for example, in response to received instructions or messages, such as messages that comprise sensor data, for example. The electrical load 808 may include a lighting load, a motor load (e.g., for a ceiling fan and/or exhaust fan), an electric motor for controlling a motorized window treatment, a component of a heating, ventilation, and cooling (HVAC) system, a speaker, or any other type of electrical load.

The control circuit 801 may be communicatively coupled to a memory 802 to store information in and/or retrieve information from the memory 802. The memory 802 may comprise a computer-readable storage media or machine-readable storage media that maintains a device dataset of associated device identifiers, network information, and/or computer-executable instructions for performing as described herein. For example, the memory 802 may comprise computer-executable instructions or machine-readable instructions that are capable of controlling the electrical load 808 in response to sensor data that is received at the control circuit as described herein. The control circuit 801 may access the instructions from memory 802 for being executed to cause the control circuit 801 to operate as described herein, or to operate one or more devices as described herein. The memory 802 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 802 may be implemented as an external integrated circuit (IC) or as an internal circuit of the control circuit 801.

The load control device 800 may include one or more communication circuits 804 that are in communication with the control circuit 801 for sending and/or receiving information as described herein. The communication circuit 804 may perform wireless and/or wired communications. The communication circuit 804 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 804 may be configured to communicate via power lines (e.g., the power lines from which the load control device 800 receives power) using a power line carrier (PLC) communication technique. The communication circuit 804 may be a wireless communication circuit including one or more RF or IR transmitters, receivers, transceivers, or other communication circuits capable of performing wireless communications.

Though a single communication circuit 804 may be illustrated, multiple communication circuits may be implemented in the load control device 800. The load control device 800 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols).

One of the communication circuits 804 may comprise a beacon transmitting and/or receiving circuit capable of transmitting and/or receiving beacon messages via a short-range RF signal. A control circuit 801 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 801.

The control circuit 801 may be in communication with one or more input circuits 806 from which inputs may be received. The input circuits 806 may be included in a user interface for receiving inputs from the user. For example, the input circuits 806 may include an actuator (e.g., a momentary switch that may be actuated by one or more physical buttons) that may be actuated by a user to communicate user input or selections to the control circuit 801. In response to an actuation of the actuator, the control circuit 801 may enter an association mode, transmit association messages from the load control device 800 via the communication circuits 804, and/or receive other information. In response to an actuation of the actuator may perform control by controlling the load control circuit 805 to control the electrical load 800, and/or by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 801 of the load control device 800 may enter the association mode, transmit an association message, control the load control circuit 805, transmit control instructions, or perform other functionality in response to an actuation or input from the user on the touch sensitive surface.

The input circuits 806 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 800). The control circuit 801 may receive information from the one or more input circuits 806 and process the information for performing functions as described herein.

The control circuit 801 may illuminate a light sources 803 (e.g., LEDs) to provide feedback to a user. The control circuit 801 may be operable to illuminate the light sources 803 different colors. The light sources 803 may be illuminate, for example, one or more indicators (e.g., visible indicators) of the load control device 800.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A device comprising:
   a first communication circuit configured to communicate via a first communication link;
   a second communication circuit configured to communicate via a second communication link; and
   a control circuit, configured to:
      receive, via the first communication circuit, messages comprising sensor data on the first communication link from a plurality of input devices, wherein the messages comprise sensor data measured at a first input device of the plurality of input devices, and wherein the messages comprise sensor data measured at a second input device of the plurality of input devices;
      aggregate the sensor data from the first input device and the sensor data from the second input device;
      in response to detection of a first threshold amount of change in the sensor data from the first input device, transmit, via the second communication circuit, a message on the second communication link that comprises the aggregated sensor data from the first input device and the second input device; and
      in response to detection of a second threshold amount of change in the sensor data from the first input device, transmit, via the second communication circuit, a plurality of messages on the second communication link, wherein the plurality of messages comprise at least one message that comprises the aggregated sensor data from the first input device and the second input device, and wherein the second threshold amount of change is greater than the first threshold amount of change.

2. The device of claim 1, wherein the control circuit is configured to transmit the plurality of messages in series with a transmission interval period of time after each message transmission.

3. The device of claim 1, wherein the first threshold amount of change and the second threshold amount of change each comprise a different threshold amount of change in the sensor data from one or more of previously measured sensor data, previously received sensor data, or previously transmitted sensor data.

4. The device of claim 1, wherein the first threshold amount of change and the second threshold amount of change each comprise a different threshold rate of change over a period of time.

5. The device of claim 1, wherein the control circuit is further configured to:
   determine a first transmission count for the first input device based on the first threshold amount of change in the sensor data from the first input device; and
   determine a second transmission count for the second input device based on the second threshold amount of change in the sensor data from the second input device.

6. The device of claim 5, wherein the message comprises a first message,
   wherein the control circuit is further configured to:
   determine, after expiration of a heartbeat interval period of time, that at least one of the first input device or the second input device are tagged for a heartbeat transmission; and
   transmit, via the second communication circuit, a second message on the second communication link comprising the aggregated sensor data for the first input device and the second input device.

7. The device of claim 1, wherein the control circuit is further configured to:
   set a first transmission count for the first input device in response to detection of the first threshold amount of change in the sensor data from the first input device; and
   set a second transmission count for the second input device in response to detection of the second threshold amount of change in the sensor data from the second input device, wherein the second transmission count is greater than the first transmission count.

8. The device of claim 7, wherein the message comprises a first message, wherein the control circuit is further configured to:
   determine that the first input device and the second input device both have a transmission count greater than a threshold; and
   transmit, via the second communication circuit, a second message on the second communication link that comprises the aggregated sensor data from the first input device and the second input device.

9. The device of claim 8, wherein the control circuit is further configured to:
   determine that the second input device has a transmission count greater than the threshold;
   determine that the first input device no longer has a transmission count greater than the threshold; and
   transmit, via the second communication circuit, a third message on the second communication link that comprises the sensor data from the second input device.

10. The device of claim 9, wherein the control circuit is configured to enter a transmit state
   to transmit the third message on the second communication link, and wherein the control circuit is further configured to:
   determine that each of the plurality of input devices fails to have a transmission count greater than the threshold;
   enter an idle state; and set an interval timer to an idle interval period of time for remaining in the idle state.

11. The device of claim 1, wherein the control circuit is further configured to:
identify a state of the device, wherein the identified state is one of a heartbeat state, a rapid state, or a backoff state; and
process the received messages according to the identified state.

12. The device of claim 11, wherein the identified state is the backoff state, and wherein the
control circuit is further configured to:
determine whether a message including sensor data has been received during an interval period of time; and
transition to the heartbeat state in response to a determination that the message including the sensor data was not received during the interval period of time.

13. The device of claim 11, wherein the identified state is the rapid state, and wherein the
control circuit is further configured to:
enter the rapid state in response to the detection of the second threshold amount of change in the sensor data from the first sensor to control an electrical load in response to the second threshold amount of change in the sensor data from the first sensor;
determine, upon expiration of an interval period of time, that the first input device is tagged for a transmission based on a transmission count of the first input device; and
transmit, via the second communication circuit, a message on the second communication link comprising sensor data for the first input device.

14. A method comprising:
receiving messages comprising sensor data on a first communication link from a plurality of input devices, wherein the messages comprise sensor data measured at a first input device of the plurality of input devices, and wherein the messages comprise sensor data measured at a second input device of the plurality of input devices;
aggregating the sensor data from the first input device and the sensor data from the second input device;
in response to detection of a first threshold amount of change in the sensor data from the first input device, transmitting a message on a second communication link that comprises the aggregated sensor data from the first input device and the second input device; and
in response to detection of a second threshold amount of change in the sensor data from the first input device, transmitting a plurality of messages on the second communication link, wherein the plurality of messages comprises at least one message that comprises the aggregated sensor data from the first input device and the second input device, and wherein the second threshold amount of change is greater than the first threshold amount of change.

15. The method of claim 14, wherein the first threshold amount of change and the second
threshold amount of change each comprise a different threshold amount of change in the sensor data from one or more of previously measured sensor data, previously received sensor data, or previously transmitted sensor data.

16. The method of claim 14, further comprising:
determining a first transmission count for the first input device based on the first threshold amount of change in the sensor data from the first input device; and
determining a second transmission count for the second input device based on the second threshold amount of change in the sensor data from the second input device.

17. The method of claim 14, further comprising:
identifying a state of the device, wherein the identified state is one of a heartbeat state, a rapid state, or a backoff state; and
processing the received messages according to the identified state.

18. A non-transitory computer-readable storage media having computer-executable instructions stored
thereon that, when executed by a control circuit, cause the control circuit to:
receive, via a first communication circuit, messages comprising sensor data on a first communication link from a plurality of input devices, wherein the messages comprise sensor data measured at a first input device of the plurality of input devices, and wherein the messages comprise sensor data measured at a second input device of the plurality of input devices;
aggregate the sensor data from the first input device and the sensor data from the second input device;
in response to detection of a first threshold amount of change in the sensor data from the first input device, transmit, via a second communication circuit, a message on a second communication link that comprises the aggregated sensor data from the first input device and the second input device; and
in response to detection of a second threshold amount of change in the sensor data from the first input device, transmit, via the second communication circuit, a plurality of messages on the second communication link, wherein the plurality of messages comprises at least one message that comprises the aggregated sensor data from the first input device and the second input device, and wherein the second threshold amount of change is greater than the first threshold amount of change.

19. The non-transitory computer readable storage media of claim 18,
wherein the computer-executable instructions, when executed by the control circuit, further cause the control circuit to:
determine a first transmission count for the first input device based on the first threshold amount of change in the sensor data from the first input device; and
determine a second transmission count for the second input device based on the second threshold amount of change in the sensor data from the second input device.

20. The non-transitory computer readable storage media of claim 18, wherein the computer-executable instructions, when executed by the control circuit, further cause the control circuit to:
identify a state of the device, wherein the identified state is one of a heartbeat state, a rapid state, or a backoff state; and
process the received messages according to the identified state.

* * * * *